(12) United States Patent
Coffland et al.

(10) Patent No.: US 9,256,220 B1
(45) Date of Patent: *Feb. 9, 2016

(54) SYSTEM AND METHOD FOR MONITORING COMPLETED MANUFACTURING OPERATIONS

(71) Applicant: The Boeing Company, Chicago, IL (US)

(72) Inventors: Donald Coffland, Seattle, WA (US); Russell N. Tice, Renton, WA (US); Sujith Mally, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 481 days.

This patent is subject to a terminal disclaimer.

(21) Appl. No.: 13/674,759

(22) Filed: Nov. 12, 2012

Related U.S. Application Data

(63) Continuation-in-part of application No. 12/145,637, filed on Jun. 25, 2008, now Pat. No. 8,311,658.

(51) Int. Cl.
| | |
|---|---|
| *G06F 19/00* | (2011.01) |
| *G01L 1/00* | (2006.01) |
| *G08B 1/08* | (2006.01) |
| *G05B 19/418* | (2006.01) |
| *G01S 5/06* | (2006.01) |
| *B25B 23/142* | (2006.01) |
| *G01S 5/04* | (2006.01) |
| *B64F 5/00* | (2006.01) |
| *B23P 19/06* | (2006.01) |

(52) U.S. Cl.
CPC ...... *G05B 19/41875* (2013.01); *B25B 23/1425* (2013.01); *G01S 5/04* (2013.01); *G01S 5/06* (2013.01); *B23P 19/066* (2013.01); *B64F 5/0009* (2013.01)

(58) Field of Classification Search
None
See application file for complete search history.

(56) References Cited

U.S. PATENT DOCUMENTS

| | | |
|---|---|---|
| 3,769,860 A | 11/1973 | Frings et al. |
| 4,403,531 A | 9/1983 | Bailey et al. |
| 4,546,678 A | 10/1985 | Stuckey |
| 4,967,472 A | 11/1990 | Ebihara et al. |
| 5,123,289 A | 6/1992 | Potesta |

(Continued)

FOREIGN PATENT DOCUMENTS

| | | |
|---|---|---|
| DE | 102005016361 A1 | 10/2006 |
| DE | 102006044937 A1 | 4/2008 |

(Continued)

OTHER PUBLICATIONS

European Search Report, dated Feb. 10, 2010, regarding Application No. EP09251348 (EP2138275), 2 pages.

(Continued)

*Primary Examiner* — Sean Shechtman
(74) *Attorney, Agent, or Firm* — Yee & Associates, P.C.

(57) ABSTRACT

A method and system comprise a tool, a number of radios, and a processor. The tool has a sensor and a wireless transmitter, and is configured to perform an operation on an area. The wireless transmitter is configured to transmit a signal comprising sensor data upon completion of the operation. The number of radios is configured to generate location measurements using the signal. The processor is configured to identify a location of the area using the location measurements and generate an indication of completion of the operation.

22 Claims, 20 Drawing Sheets

(56) References Cited

U.S. PATENT DOCUMENTS

| | | | |
|---|---|---|---|
| 5,321,619 | A | 6/1994 | Matsuda et al. |
| 5,743,158 | A | 4/1998 | Perkins |
| 5,898,379 | A | 4/1999 | Vanbergeijk |
| 5,992,436 | A | 11/1999 | Hellman et al. |
| 6,021,694 | A | 2/2000 | Beger |
| 6,260,043 | B1 | 7/2001 | Puri et al. |
| 6,301,999 | B1 | 10/2001 | Garg |
| 6,710,776 | B2 | 3/2004 | Usaki |
| 6,796,190 | B2 | 9/2004 | Curry |
| 6,882,315 | B2 | 4/2005 | Richley et al. |
| 6,922,599 | B2 | 7/2005 | Richey |
| 6,927,688 | B2 | 8/2005 | Tice |
| 6,968,759 | B2 | 11/2005 | Becker et al. |
| 7,035,877 | B2 | 4/2006 | Markham et al. |
| 7,055,233 | B1 | 6/2006 | Hofer et al. |
| 7,089,834 | B2 | 8/2006 | Reynertson et al. |
| 7,787,981 | B2 * | 8/2010 | Austin et al. ............... 700/168 |
| 7,819,025 | B2 | 10/2010 | Coffland |
| 7,876,216 | B2 | 1/2011 | Coffland et al. |
| 8,294,571 | B2 | 10/2012 | Coffland et al. |
| 8,311,658 | B2 * | 11/2012 | Coffland et al. ............ 700/108 |
| 2001/0006384 | A1 | 7/2001 | Usaki |
| 2003/0025602 | A1 * | 2/2003 | Medema et al. .......... 340/568.1 |
| 2003/0158795 | A1 | 8/2003 | Markham et al. |
| 2004/0108954 | A1 | 6/2004 | Richley et al. |
| 2004/0159164 | A1 | 8/2004 | Curry |
| 2005/0092143 | A1 | 5/2005 | Lehnert et al. |
| 2006/0071790 | A1 * | 4/2006 | Duron et al. .............. 340/572.1 |
| 2006/0220851 | A1 * | 10/2006 | Wisherd ..................... 340/568.1 |
| 2007/0221015 | A1 | 9/2007 | Hsieh |
| 2008/0018912 | A1 | 1/2008 | Schreiber |
| 2008/0177417 | A1 | 7/2008 | Kasuga et al. |
| 2008/0178713 | A1 | 7/2008 | Long et al. |
| 2008/0306622 | A1 | 12/2008 | Bailey et al. |
| 2009/0192644 | A1 | 7/2009 | Meyer et al. |
| 2009/0320653 | A1 | 12/2009 | Coffland |
| 2009/0322516 | A1 | 12/2009 | Coffland et al. |
| 2009/0326699 | A1 | 12/2009 | Coffland et al. |
| 2011/0164657 | A1 | 7/2011 | Coffland et al. |

FOREIGN PATENT DOCUMENTS

| | | |
|---|---|---|
| EP | 1859906 A2 | 11/2007 |
| EP | 1930240 A1 | 6/2008 |
| EP | 2138275 A2 | 12/2009 |
| EP | 2138861 A1 | 12/2009 |
| EP | 2138920 A2 | 12/2009 |
| JP | 2004118304 A | 4/2004 |
| JP | 2006098186 A | 4/2006 |
| WO | WO8700109 A1 | 1/1987 |
| WO | WO03041914 A2 | 5/2003 |

OTHER PUBLICATIONS

European Search Report, dated Sep. 14, 2009, regarding Application No. EP09251616 (EP2138861), 3 pages.

Agarwal et al., "Dead Reckoning in Mobile Ad-Hoc Networks," IEEE Wireless Communications and Networking Conference, vol. 3, Mar. 2003, pp. 1838-1843.

Bormann et al., ""Robust Header Compression WG (ROHC),"" 61st Internet Engineering Task Force Meeting (IETF 61), Nov. 2004, 52 pages. http://www.ietf.org/proceedings/61/slides/rohc-0.pdf.

Chou, "Evaluation of UWB Techniques for Indoor Position Locationing," Master's Thesis, Oregon State University, Jun. 2005, pp. 1-51.

Chung et al., "An Accurate Ultra Wideband (UWB) Ranging for Precision Asset Location," IEEE Conference on Ultra Wideband Systems and Technologies, Nov. 2003, pp. 389-393.

Eltaher et al., "A Novel Approach based on UWB Beamforming for Indoor Positioning in None-Line-of-Sight Environments," RadioTeCe, Oct. 2005, 5 pages.

Fontana et al., "Commercialization of an Ultra Wideband Precision Asset Location System," IEEE Conference on Ultra Wideband Systems and Technologies, Nov. 2003, pp. 369-373.

Jo et al., "Accuracy Enhancement for UWB Indoor Positioning Using Ray Tracing," IEEE/ION Position, Location, and Navigation Symposium, Apr. 2006, pp. 565-568.

Low et al., "Pulse Detection Algorithm for Line-of-Sight (LOS) UWB Ranging Applications," IEEE Antennas and Wireless Propagation Letters, Jun. 2005, pp. 63-67.

Perkins et al., "Ad-hoc On-Demand Distance Vector Routing," Second IEEE Workshop on Mobile Computing Systems and Applications, Feb. 1999, pp. 90-100.

Shah et al., "Enhanced Position Location with UWB in Obstructed LOS and NLOS Multipath Environments," EUSIPCO 2005 13th European Signal Processing Conference, Sep. 2005, 4 pages.

Zhao et al., "UWB Positioning Using Six-Port Technology and a Learning Machine," IEEE Mediterranean Electrotechnical Conference, May 2006, pp. 352-355.

"GCI Torque Reaction Arms—SmartARM," GCI, accessed Mar. 7, 2012, 1 page. http://www.gcilift.com/SmartARM_2008.pdf.

"Indoor Positioning," Thales Research and Technology (UK) Ltd., Jun. 2006, 1 page. http://web.archive.org/web/20060621031919/http:--thalesresearch.com/Default.aspx?tabid-166.

"Snap-On Techwrench Technical p.," Snap-On Incorporated, Nov. 2005, 9 pages. http://buy1.snapon .com/products/torque/pdf/techwrench/TECHWRENCH%20INTERNET%20SITE.pdf.

Office Action, dated Jul. 26, 2010, regarding U.S. Appl. No. 12/145,604, 6 pages.

Notice of Allowance, dated Dec. 8, 2010, regarding U.S. Appl. No. 12/145,604, 7 pages.

Office Action, dated Jul. 21, 2011, regarding U.S. Appl. No. 12/835,092, 10 pages.

Notice of Allowance, dated Dec. 12, 2011, regarding U.S. Appl. No. 12/835,092, 8 pages.

Notice of Allowance, dated Apr. 2, 2012, regarding U.S. Appl. No. 12/835,092, 13 pages.

Office Action, dated Nov. 17, 2009, regarding U.S. Appl. No. 12/145,623, 9 pages.

Notice of Allowance, dated Apr. 12, 2010, regarding U.S. Appl. No. 12/145,623, 5 pages.

Notice of Allowance, dated Jun. 22, 2010, regarding U.S. Appl. No. 12/145,623, 8 pages.

Office Action, dated Oct. 12, 2010, regarding U.S. Appl. No. 12/145,637, 44 pages.

Final Office Action, dated Apr. 26, 2011, regarding U.S. Appl. No. 12/145,637, 32 pages.

Notice of Allowance, dated Feb. 3, 2012, regarding U.S. Appl. No. 12/145,637, 17 pages.

Notice of Allowance, dated Jul. 5, 2012, regarding U.S. Appl. No. 12/145,637, 12 pages.

Extended European Search Report, dated Aug. 11, 2014, regarding Application No. EP09251611.1, 7 pages.

* cited by examiner

SYSTEM AND METHOD FOR MONITORING COMPLETED MANUFACTURING OPERATIONS

CROSS REFERENCE TO RELATED APPLICATIONS

This application is a continuation-in-part application of U.S. patent application Ser. No. 12/145,637, filed Jun. 25 2008, now U.S. Pat. No. 8,311,658. U.S. patent application Ser. No. 12/145,637 is related to U.S. patent application Ser. No. 12/145,604, now U.S. Pat. No. 7,876,216, and U.S. patent application Ser. No. 12/145,623, now U.S. Pat. No. 7,819,025, both filed on Jun. 25, 2008, each of which applications is incorporated by reference herein in its entirety.

BACKGROUND INFORMATION

1. Field

This disclosure generally relates to manufacturing operations, and deals more particularly with a system and related method for locating and reporting completed manufacturing operations, especially those involving the assembly of parts.

2. Background

During the production of complex assemblies, such as aircraft, there is sometimes a need to monitor manufacturing operations and verify that certain operations or procedures have been properly performed. For example, aircraft landing gear may be controlled by hydraulic systems comprising hundreds of hydraulic tubes and fittings that must be assembled within a relatively small space within a wheel well. Each of these fittings may include a nut that is tightened or "torqued" by an assembly worker to a nominal torque value. Because of the large number of nuts that must be torqued, it is desirable to both monitor which nuts have been torqued, and verify that the nuts have been torqued to the correct values, since the failure to properly assemble fittings and/or torque nuts to nominal values may result in hydraulic leaks that must be later corrected. Past attempts to monitor and verify nut torquing have involved an assembly worker painting marks on the nuts to visually indicate that they have been torqued; however, this technique may be subject to human error, and in any event, may not allow verification that the nut has been torqued to the correct value.

Verifying that nuts have been torqued to the correct values may be particularly challenging where they are tightly clustered or are located near obstructions that prevent an assembly worker from using a conventional torque-reading wrench to tighten the nuts. In these limited clearance situations, the assembly worker must use off-axis wrenches that may not provide an accurate indication of the torque value. Accordingly, the assembly worker must resort to non-precise techniques used for estimating the amount of torque needed to tighten the nut.

Accordingly, there is a need for a system for monitoring and verifying the completion of certain manufacturing operations, such as torquing of nuts, particularly in an aircraft assembly environment.

SUMMARY

In an illustrative example, a system comprises a tool, a number of radios, and a processor. The tool has a sensor and a wireless transmitter, and is configured to perform an operation on an area. The wireless transmitter is configured to transmit a signal comprising sensor data upon completion of the operation. The number of radios is configured to generate location measurements using the signal. The processor is configured to determine a location of the area using the location measurements and generate an indication of completion of the operation.

In another illustrative example, a method is present. A signal comprising sensor data is received from a wireless transmitter associated with a tool upon completion of an operation on an area using the tool. Location measurements are generated from the signal. A location of the wireless transmitter is identified in an object space using the location measurements. A location of the area in an image coordinate system is identified using the location of the wireless transmitter in the object space. Completion of the operation is indicated in an image using the location of the area in the image coordinate system.

In yet another illustrative example, a method is presented. A number of signals are received from a wireless transmitter associated with a tool, the number of signals transmitted during an operation on an area using the tool. Location measurements are generated from the number of signals. A location of the area in an object space is identified using the location measurements. The location of the area in the object space is converted to a location in an image coordinate system.

The features and functions can be achieved independently in various embodiments of the present disclosure or may be combined in yet other embodiments in which further details can be seen with reference to the following description and drawings.

BRIEF DESCRIPTION OF THE ILLUSTRATIONS

DETAILED DESCRIPTION

Figure 1:
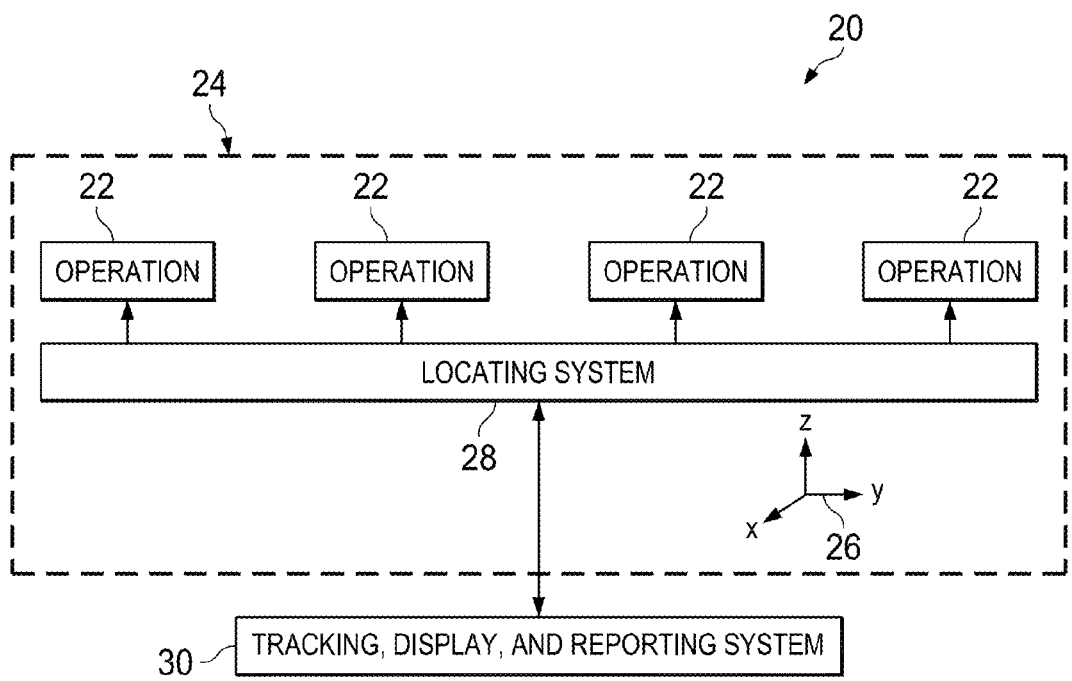
FIG. 1 is an illustration of a block diagram of a system for locating the completion of manufacturing operations in accordance with an illustrative embodiment.

The disclosed embodiments provide a system for monitoring the completion of manufacturing operations in a manufacturing environment and can be used where a large number of similar or identical operations are required to be performed and it is necessary to monitor those operations have been performed and those that are yet to be performed. The disclosed system allows remote monitoring of the completion of operations, as well as local monitoring by an assembly worker so that the worker can quickly determine which operations have already been completed. In one embodiment, the system may be used for determining when operations have been performed on subassemblies or groups of assemblies.

In addition to monitoring the completion of manufacturing operations, the system may transmit data representing a condition, such as a torque value in applications where the system is used to monitor torquing of nuts within a wheel well of an aircraft. The disclosed embodiments may include a display system that provides an image of the completed operation within a three dimensional display of its surrounding environment, as well as a display of the acquired data relating to the operation that has been completed.

According to one disclosed embodiment, a system is provided for monitoring the completion of manufacturing operations in a manufacturing environment, comprising: means for determining when an operation has been completed; means for wirelessly transmitting a signal from the location of the operation indicating the operation has been completed; means for locating the 3D position of the operation in a coordinate system of the manufacturing environment based on the transmitted signal; a data set representing a 3D image of the manufacturing environment; and means for displaying the 3D image of the manufacturing environment and for displaying the location of the completed operation within the 3D image. The means for determining whether an operation has been completed may include a tool for completing the operation wherein the wireless transmitting means is carried on the tool. In one application, the tool may comprise a torque wrench including a strain gauge sensor for sensing the applied torque.

According to another disclosed embodiment, a system is provided for monitoring the completion of an operation performed on subassemblies within a manufacturing environment, comprising: a portable tool for performing an operation on each of the subassemblies; a wireless transmitter on the tool for wirelessly transmitting a signal indicating the tool has completed an operation on one of the subassemblies; means for locating the position of the tool in a first 3D coordinate system in the manufacturing environment, based on the transmitted signal; a data set representing a 3D image of the manufacturing environment in a second 3D image coordinate system; a processor coupled with a locating means and the data set for converting the 3D position of the tool located in the first coordinate system to a 3D position in the second coordinate system; and display means for displaying the location of the tool in a 3D image of the manufacturing environment. The tool may comprise a torque wrench including means for sensing when the torque wrench has applied a preselected level of torque to the subassembly, and a trigger circuit for triggering the operation of a wireless transmitter. The manufacturing environment may comprise a harsh radio frequency (RF) environment and the transmitted signal may comprise an ultra wideband (UWB) pulse signal. The manufacturing environment may comprise an aircraft undergoing assembly and the subassemblies may include fasteners tightened by the tool.

According to a disclosed method embodiment, monitoring operations performed on subassemblies within a manufacturing environment comprises: moving a tool to the location of one of the subassemblies; using the tool to complete an operation on the subassembly; wirelessly transmitting a signal from the tool indicating that the operation of the subassembly has been completed; receiving the transmitted signal; using the received signal to locate the position of the tool in a 3D coordinate system of the manufacturing environment; providing a 3D data file representing a 3D image of the manufacturing environment; converting the located position of the tool in the 3D coordinate system of the manufacturing environment to a position in the coordinate system of the 3D image of the manufacturing environment; and displaying the subassembly on which the operation was completed within the 3D image of the manufacturing environment. The subassemblies may comprise fasteners, and moving the tool may include moving a wrench to a fastener on the subassembly where it is used to tighten the fastener. The method may further comprise measuring the level of torque applied to the fastener, and transmitting the wireless signal may include transmitting the measured level of torque.

The disclosed embodiments satisfy a need for monitoring the completion of manufacturing operations in a manufacturing environment in which operations are automatically located and displayed.

Referring first to FIG. 1, locating and reporting system 20 may be used for locating each of a plurality of manufacturing operations 22 within manufacturing environment 24, and for reporting the status of at least one operation at the located manufacturing. The reported status may include a notice that the operation has been started, is underway, and/or has been completed. The three dimensional location of each of manufacturing operations 22 may be defined in three dimensional coordinate system 26 within manufacturing environment 24. In one embodiment, manufacturing environment 24 may be a harsh radio frequency environment in which obstructions or other environmental factors result in radio frequency signal reflection, signal attenuation, and/or signal blockage due to the lack of line of sight between transmitter and receiver.

Locating and reporting system 20 may include locating system 28, and reporting and display system 30 which can be used to monitor the location of manufacturing operations 22 within three-dimensional coordinate system 26 and display these operations as well as the status of manufacturing operations 22 within a second, later discussed coordinate system. As will be discussed below in more detail, locating and reporting system 20 may be used to locate each of manufacturing operations 22 directly or indirectly by locating a portable component such as a torque wrench which may be moved to the location of each of manufacturing operations 22.

Figure 2:
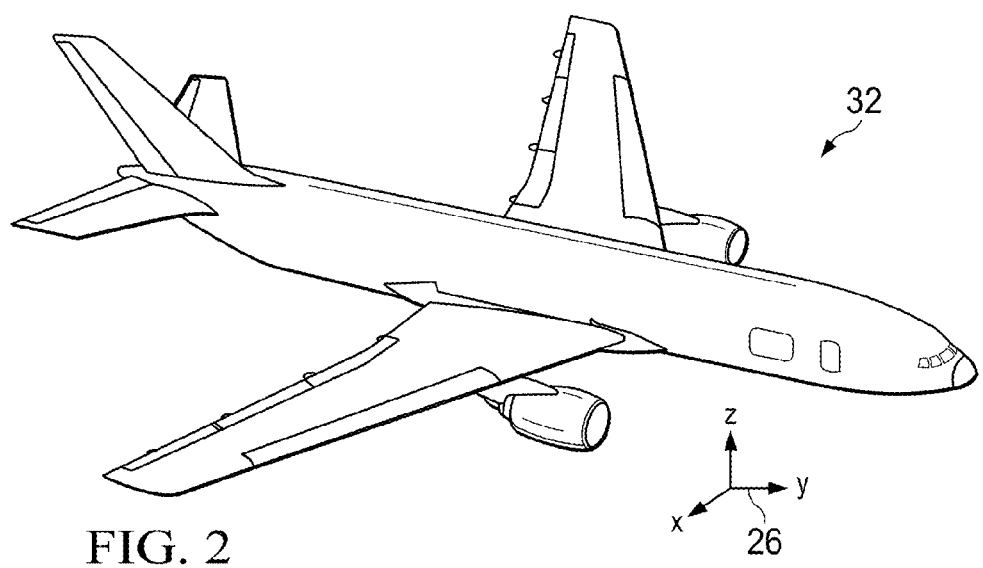
FIG. 2 is an illustration of a perspective view of an aircraft, including a three dimensional coordinate system used to define the location of manufacturing operations performed within the aircraft in accordance with an illustrative embodiment.
Figure 3:
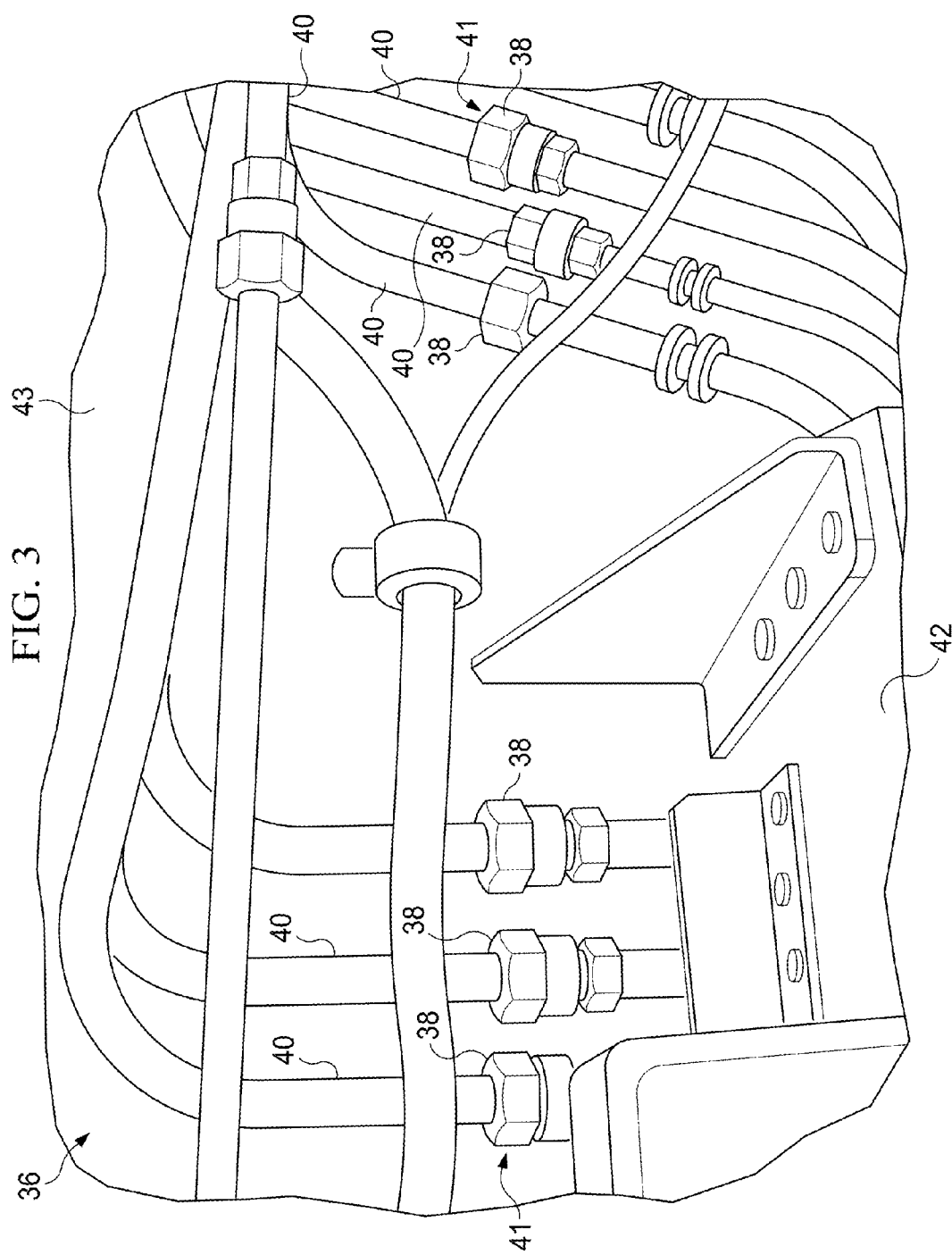
FIG. 3 is an illustration of a perspective view showing a portion of a wheel well forming part of the aircraft shown in FIG. 2 in accordance with an illustrative embodiment.

Referring to FIG. 2, locating and reporting system 20 may be used to locate manufacturing operations 22 on aircraft 32, in which object space may be defined in three dimensional coordinate system 26 of aircraft 32. Manufacturing operations 22 may comprise, for example and without limitation, operations such as the assembly of subassemblies (not shown) during the production of aircraft 32. For example, as shown in FIG. 3, wheel well 36 on aircraft 32 may contain a multiplicity of hydraulic tubes 40 having threaded fittings 41 provided with nuts 38 for connecting and tightening threaded fittings 41. Nuts 38 may also be referred to as fasteners. The assembly of threaded fittings 41, including torquing of nuts 38, comprises assembly operations that may be monitored and reported using locating and reporting system 20. Wheel well 36 may include various metallic structures 42 used for reinforcement or component mounting that preclude line of sight within wheel well 36 and/or reflect or attenuate radio frequency signals. In some cases, nuts 38 may be located in close quarters to which there may be limited access, as where they are tightly grouped, for example, against bulkhead 43.

Figure 4:
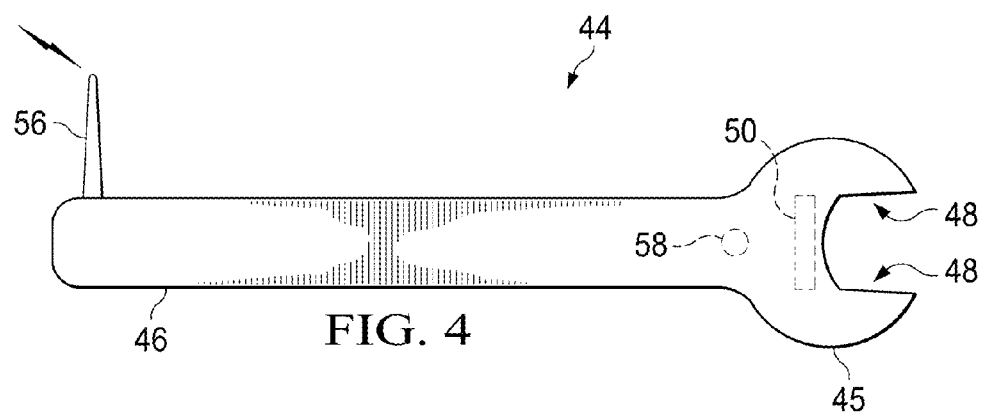
FIG. 4 is an illustration of a side view of one embodiment of a wrench used to torque nuts on hydraulic fittings within the wheel well shown in FIG. 3 in accordance with an illustrative embodiment.
Figure 5:
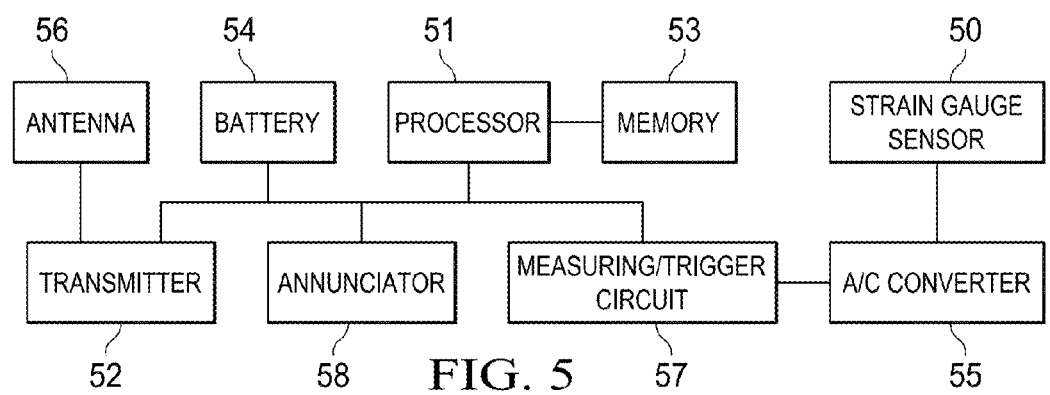
FIG. 5 is an illustration of a block diagram of a circuit forming part of the torque wrench shown in FIG. 4 in accordance with an illustrative embodiment.
Figure 6:
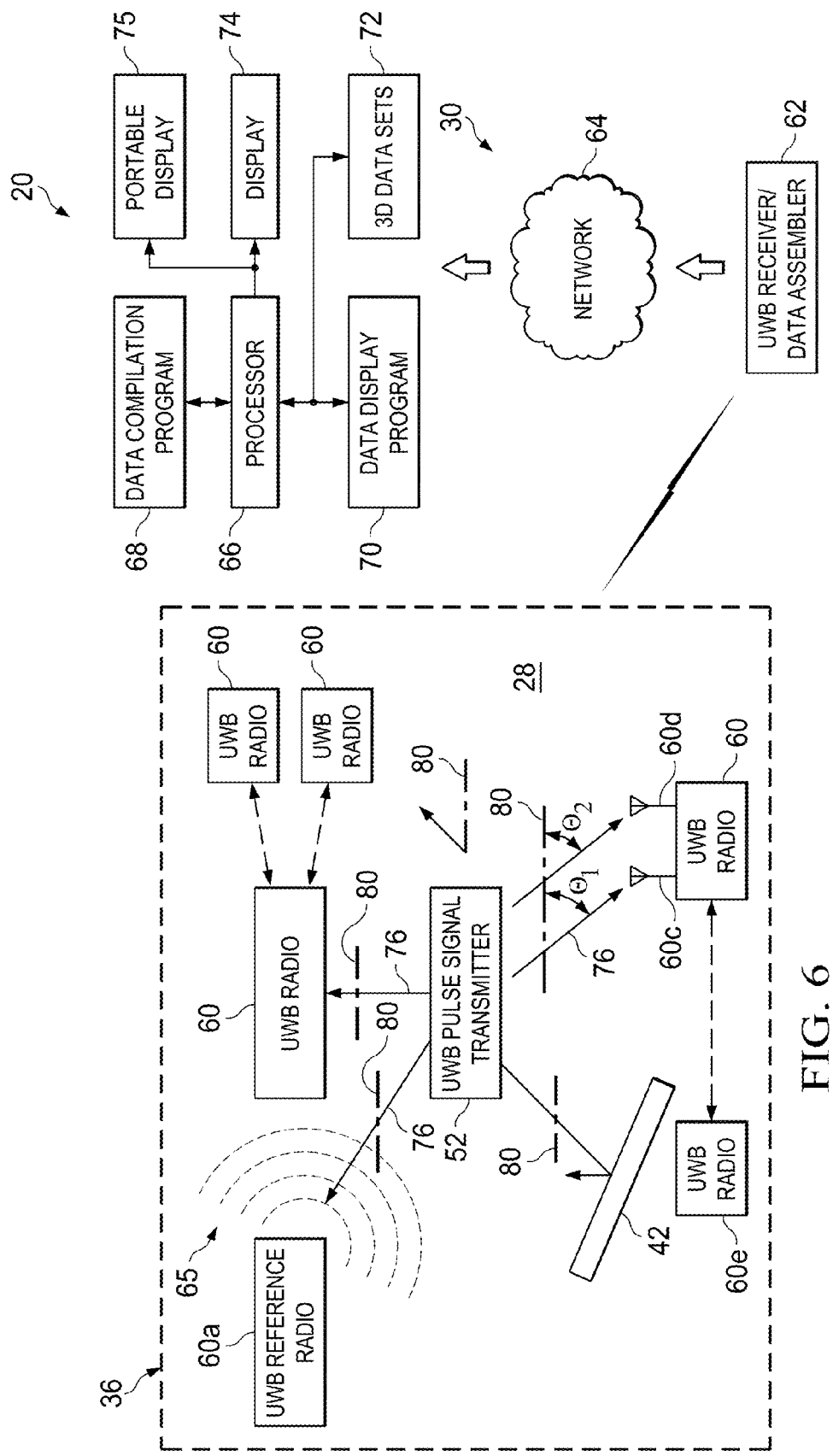
FIG. 6 is a combined block and diagrammatic illustration of a system for locating and reporting the completion of manufacturing operations performed in a harsh radio frequency (RF) environment in accordance with an illustrative embodiment.

Reference is now made to FIGS. 4-8 which depict additional details of locating and reporting system 20 adapted for use in locating and reporting the torque condition of nuts 38. In this application, as best seen in FIG. 6, locating and reporting system 20 may utilize a UWB pulse signal to locating system 28 which comprises a UWB pulse signal transmitter 52 carried on electronic torque wrench 44, and a plurality of UWB radios 60 that are optimally positioned within wheel well 36 such that at least two of UWB radios 60 are within the line of sight of each of nuts 38.

As shown in FIG. 4, the electronic torque wrench 44 used to torque nuts 38 includes head 45 mounted on the end of handle 46. Head 45 includes jaws 48 for engaging the flats of the nuts 38, and a strain gauge sensor 50 mounted near the jaws 48. Strain gauge sensor 50 produces an electrical signal related to the magnitude of the torque applied to nut 38 by electronic torque wrench 44.

Additional components contained within electronic torque wrench 44 are shown in FIG. 5. UWB pulse signal transmitter 52 is contained within handle 46 and transmits UWB pulse signals on antenna 56 carried on or within handle 46. The UWB pulse signals transmitted by UWB pulse signal transmitter 52 may include data representing the magnitude of torque sensed by strain gauge sensor 50, or more simply that a torque of unreported value has been applied. The analog signal generated by strain gauge sensor 50 may be converted to a digital signal by converter 55. Measuring/trigger circuit 57 measures the digital signal and issues a trigger signal when the measured signal exceeds a threshold value, indicating, for example, that a nut has been torqued to a nominal value, or has surpassed a minimum threshold to indicate torque has been or is being applied. Processor 51 and memory 53 control various operations of electronic torque wrench 44, including UWB pulse signal transmitter 52 and annunciator 58 on head 45 which alerts an assembly worker that the torque being applied to a nut 38 has reached a nominal value, which may be stored in memory 53. Processor 51 may comprise a microprocessor, or any other suitable processor. Memory 53 may be associated with processor 51. The annunciator 58 may comprise, for example and without limitation, an LED or other light (shown at 58), an audio signal generator (not shown), or a vibrator (not shown) in handle 46. The electronic components of electronic torque wrench 44, including UWB pulse signal transmitter 52 may be powered by battery 54 housed within handle 46. It may be possible to retrofit conventional wrenches with one or more of the electronic components mentioned immediately above to provide the required functions of electronic torque wrench 44.

Certain manufacturing operations requiring the use of electronic torque wrench 44 may be conducted within harsh radio frequency environments, such as the illustrated aircraft wheel well application, that lack infrastructure which could otherwise provide references useful in making location measurements. Accordingly, in harsh radio frequency environments, the nodes, i.e., UWB radios 60 may be deployed at positions that optimize line of sight communication with the locations where nuts 38 are to be torqued. The three dimensional coordinate system 26 established within wheel well 36 allows estimations of locations within a common frame of reference. It may also be desirable to optimize the transmission protocol in order to reject reflective signals by using timing techniques carried in the leading edge of the transmitted UWB pulse signals.

According to one embodiment, the generated pulse signals may be baseband signals that are mixed by a mixer to move their center frequency to the desired frequency bands which may be, in an application involving monitoring of nut torquing within wheel well 36, around 4 GHz, providing an effective spectrum of approximately 3.1 to 5.1 GHz, and location measurement accuracy less than approximately one-half inch. In other applications, UWB pulse signal transmitter 52 having a center frequency of approximately 6.85 GHz for a full FCC part 15 spectrum spread of 3.1-10.6 GHz, may be appropriate.

In accordance with the disclosed embodiments, the deployment of ad hoc nodes in the form of UWB radios 60 can be used to navigate around any blockages in the line of sight between the location of UWB pulse signal transmitter 52 and UWB radios 60. Various reference materials exist in the art which teach suitable methods and techniques for resolving positional estimates in a network of ad hoc nodes, including, for example and without limitation, the following:

Bormann et al., "Robust Header Compression WG", 61st Internet Engineering Task Force Meeting (IETF 61), November 2004.

Perkins, C., "Ad hoc On-Demand Distance Vector (AODV) Routing", Network Working Group, RFC 3561, July 2003.

Agarwal, A. and S. Das, "Dead Reckoning in Mobile Ad-Hoc Networks", IEEE WCNC 2003, the 2003 IEEE Wireless Communications and Networking Conference, March 2003.

Thales Research & Technology Ltd. "Indoor Positioning", available online from Thales Research & Technology Ltd.

Some of the techniques well known in the art use iterative lateration of the generated pulse signals by solving a constraint based positional model. While this approach may be satisfactory for some applications, in other applications, such as locating nuts within an aircraft wheel well, it may be necessary that the ad hoc network be propagated with position aware nodes in order to provide the desired results.

As will be discussed below in more detail, UWB radios 60 receive the pulse signals from electronic torque wrench 44 and generate location measurements that may be used to calculate the location of electronic torque wrench 44, and thus, the location of nut 38 being torqued by the wrench 44. In other embodiments, it may be possible to use one or more UWB radios 60 which include a pair of spaced apart receiving antennas 60c and 60d. UWB radio 60 generates location measurements based on the angle of arrival (AOA) and the time difference of arrival (TDOA) of pulse signals 76 transmitted by UWB pulse signal transmitter 52 on electronic torque wrench 44. In the case of UWB radios 60, pulse signals 76 arrive respectively at antennas 60c and 60d at slightly different angles $\theta_1$ and $\theta_2$ relative to reference axis 80 that is based in three dimensional coordinate system 26 (FIGS. 1 and 2) used to locate nuts 38 in the three dimensional object space. Similarly, UWB radios 60 each measure the AOA and TDOA of the arriving pulse signals 76 relative to reference axis 80. The AOA and TDOA measurements generated by at least two of UWB radios 60 may then be used to calculate the three dimensional location of UWB pulse signal transmitter 52 (and thus electronic torque wrench 44 and nut 38) using common iterative lateralization techniques.

Any of several different techniques may be employed for measuring the AOA positioning. One such method has been previously described in which UWB radios 60 include two spaced apart receiving antennas 60c and 60d each of which receives the signal transmitted by UWB pulse signal transmitter 52. The angle of the line connecting UWB radios 60 and electronic torque wrench 44 is measured with respect to source data stored in 3D data sets 72. 3D data sets 72 may take the form of three dimensional data set files. The reference angle corresponds to the orientation of the line intersecting each of the collocated receiving antennas 60c and 60d. By measuring orientation to multiple reference antennas, the position of electronic torque wrench 44 may be determined.

Various techniques can be used for measuring TDOA. One such method involves receiving the transmitted pulse signals by multiple UWB radios 60 and dedicating UWB reference radio 60a to calibrating the remaining UWB radios 60 in the network. The receiving UWB radio 60 determines the direct path to electronic torque wrench 44 by measuring the TDOA of the signal. At least four such measurements may be required to determine the position of electronic torque wrench 44 by iterative lateration.

The performance of UWB radios 60 may be measured in terms of the packet success rate, accuracy of measured vs. actual distance, standard deviation, and the signal/noise levels. The packet success rate may be defined as the number of successful packet exchanges between UWB radios 60. The measured distance is computed by processing the UWB pulse signals transmitted by UWB pulse signal transmitter 52. The actual distance is the distance between two receiving UWB radios 60 as measured using a physical device. The standard deviation is a measure of how widely the measured distance values are dispersed from the mean. The signal and noise levels may be computed from the signal waveform as follows:

$$SignalLevel = 10 * \log\left(\frac{SquareofMaxValueofADCCounts}{2}\right)$$

NoiseLevel=10*log(NoiseVarianceof5 nsOfTheWaveform)

Locating system 28 may include UWB reference radio 60a which broadcasts beacon signal 65 that is used to calibrate UWB radios 60. Because of the close quarters and various obstructions such as structure 42 that may be present within wheel well 36, one or more of UWB radios 60, such as UWB radio 60e may not be within the line of sight of UWB pulse signal transmitter 52. The required accuracy or location measurement where the line of sight between UWB pulse signal transmitter 52 and one of UWB radios 60 is blocked can be overcome by installing extra UWB radios 60 over the minimum number required for normal TDOA calculations, and then performing signal processing algorithms to identify the particular receiver that is not within line of sight with UWB pulse signal transmitter 52.

The location measurements generated by UWB radios 60 may be transmitted from locating system 28 to UWB receiver and data assembler 62 which assembles the location measurements, along with the torque data forming part of the pulse signals transmitted from electronic torque wrench 44. Depending upon the application, the assembled data may be transmitted through network 64 to monitoring, display, and reporting system 30. Networks 54 may comprise, for example and without limitation, a WAN, LAN, or the Internet. Monitoring, display, and reporting system 30 may include processor 66, data compilation program 68, data display program 70, three dimensional data set files 72, and one or more displays, such as display 74 and portable display 75.

Processor 66 may comprise a programmed PC which uses data compilation program 68 to calculate the position of UWB pulse signal transmitter 52 based on the location measurements. Processor 66 also uses data display program 70 to cause the display of images which illustrate or highlight the location of the nut 38 being torqued within a three dimensional image produced from 3D data set files 72. Three dimensional data set files 72 may comprise, for example and without limitation, a CAD file produced by any of various solid modeling programs such as, without limitation, CATIA. In effect, monitoring, display, and reporting system 30 maps the locations of the nuts 38 to data set coordinates in the solid modeling program.

Figure 7:
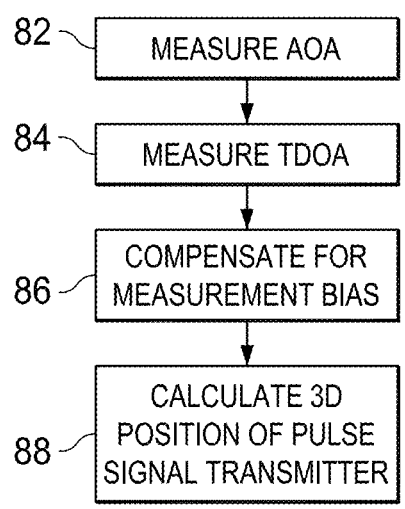
FIG. 7 is an illustration of a simplified flow diagram of a method for locating the three dimensional position of the pulse signal transmitter forming part of the system shown in FIG. 6 in accordance with an illustrative embodiment.

The method for calculating the position of UWB pulse signal transmitter 52 is illustrated in FIG. 7 in which the AOA and TDOA are respectively measured at 82 and 84 by UWB radios 60. In some cases, measurement bias may be introduced as a result of the lack of line of sight between UWB radios 60, and incorrect lock on the signal to detect direct path or leading edge of the signal. This is due to the consistent leading edge detection occurring at the shortest path between UWB radios 60. This measurement bias may be compensated using any of several methods, including using leading edge algorithms using look-up tables for regions within wheel well 36 to compensate for the bias or for counting for the error as position errors. Accordingly, compensation may be made at 86 for the measurement bias. Finally, at 88, processor 66 calculates the three dimensional position of UWB pulse signal transmitter 52 within three dimensional coordinate system 26 of manufacturing environment 24, which in the illustrated example comprises wheel well 36.

Figure 8:
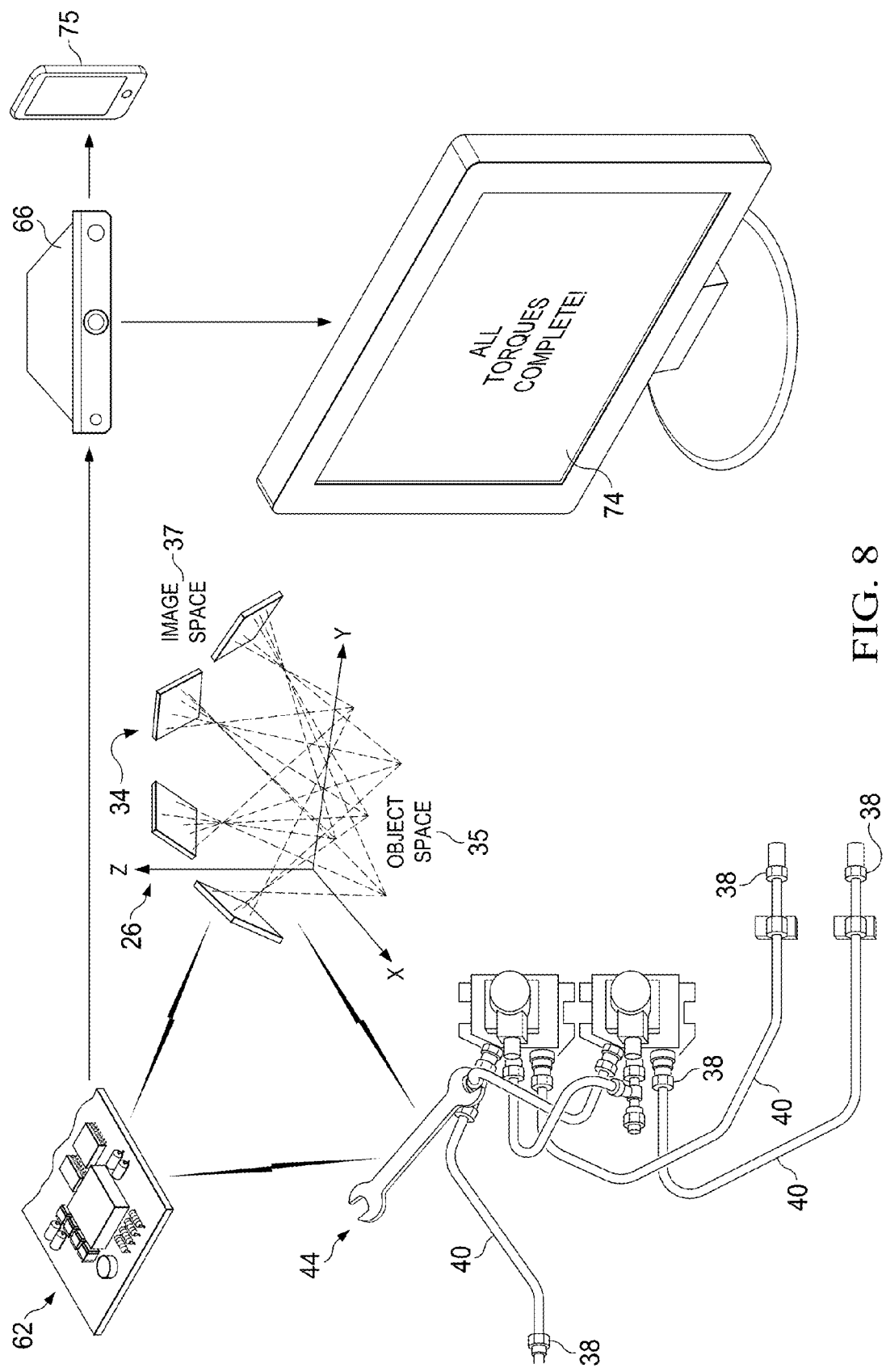
FIG. 8 is a diagrammatic illustration showing the major components of the system for locating and reporting the completion of manufacturing operations in accordance with an illustrative embodiment.

Referring now particularly to FIG. 8, displays 74 and 75 each combine graphic and quantitative data in real time to provide a display of the current state of wheel well 36. In order to display nut 38 being torqued in a three dimensional reference image assembled from 3D data set files 72, processor 66 mathematically translates the 3D location of UWB pulse signal transmitter 52 in three dimensional coordinate system 26 of wheel well 36, to a second coordinate system 34 of the 3D image created from 3D data set files 72. The first three dimensional coordinate system 26 effectively defines object space 35, i.e., the 3D space in which electronic torque wrench 44 is moved from nut to nut in nuts 38, and coordinate system 34 defines image space 37 containing the displayed image created from 3D data set files 72.

Display 74 may be used by production personnel to remotely locate, monitor, and record the status (e.g., initiation, progress, and/or completion), of assembly operations, such as the torquing of nuts 38. Additionally, display 75 may be portable and may be employed by an assembly worker to view the same or similar data that is displayed on display 74 so that the worker can monitor and verify which of nuts 38 have been torqued, or have yet to be torqued.

Figure 9:
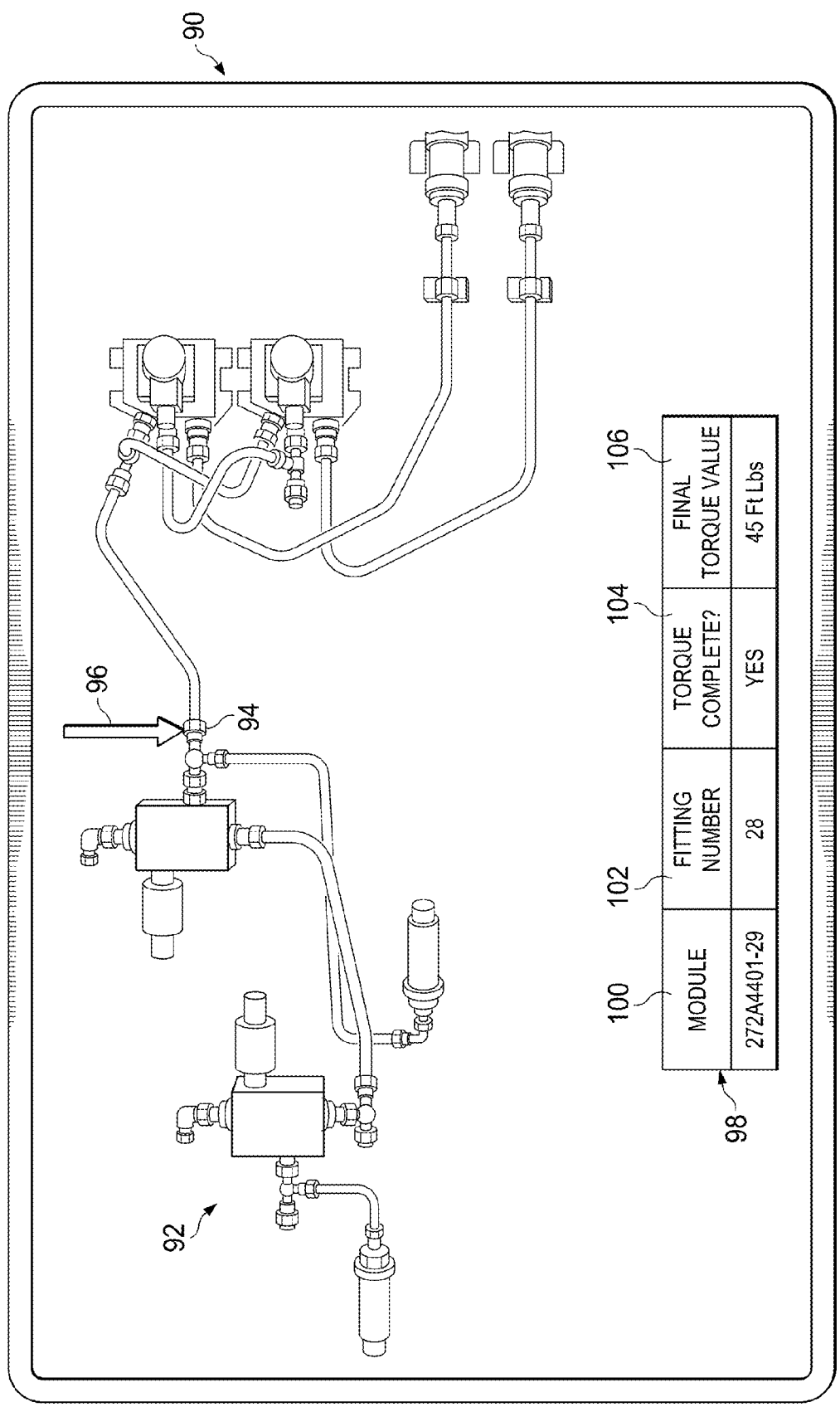
FIG. 9 is an illustration of one typical screen display showing a located manufacturing operation and reported completion status in accordance with an illustrative embodiment.

Reference is now made to FIG. 9 which discloses a typical screen display 90 that may be viewed on either of displays 74 or 75. In this example, hydraulic module 92 is displayed in which arrow 96 is used to indicate nut 94 that is or has just been torqued. Summary information in table 98 may also be displayed which may indicate module number 100 identifying hydraulic module 92, fitting number 102 identifying the particular fitting being torqued, status 104 of torque completion, and final torque value 106.

Figure 10:
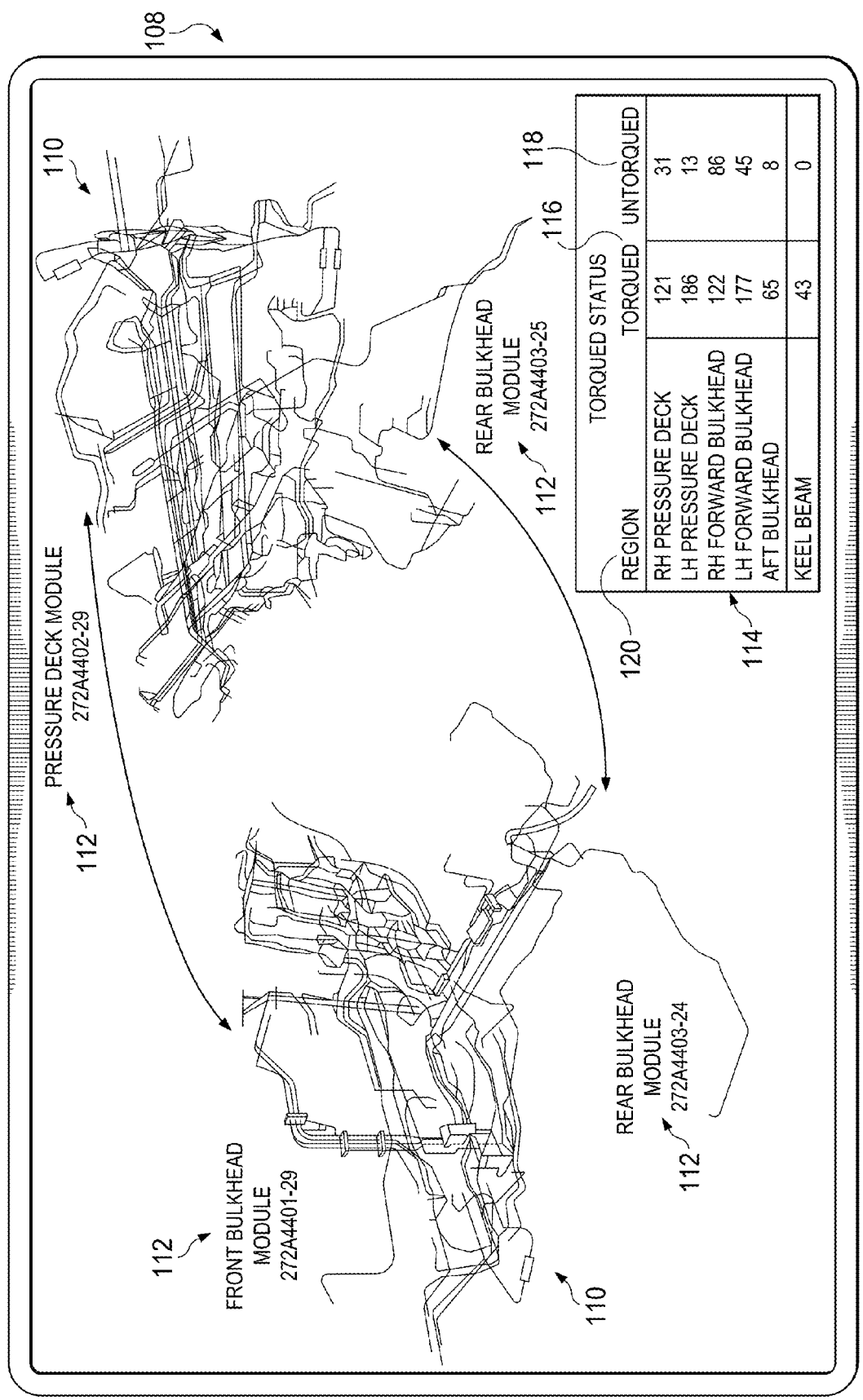
FIG. 10 is an illustration of another screen display showing summary information related to manufacturing operations and reported completion status in accordance with an illustrative embodiment.

Referring now also to FIG. 10, summary information may be displayed on display 74 that may include groups 110 of modules along with indicia 112 that identifies the module group. Additionally, table 114 may be displayed that shows torque status in summary form. For example, the torque status may include number 116 of nuts that have been torqued for group 110, and number 118 of nuts that have not yet been torqued for each of module group regions 120. A variety of other types of specific summary information may be displayed along with images of the modules and/or fittings, all in real time while an assembly worker is assembling the fittings and torquing nuts 38.

Figure 11:
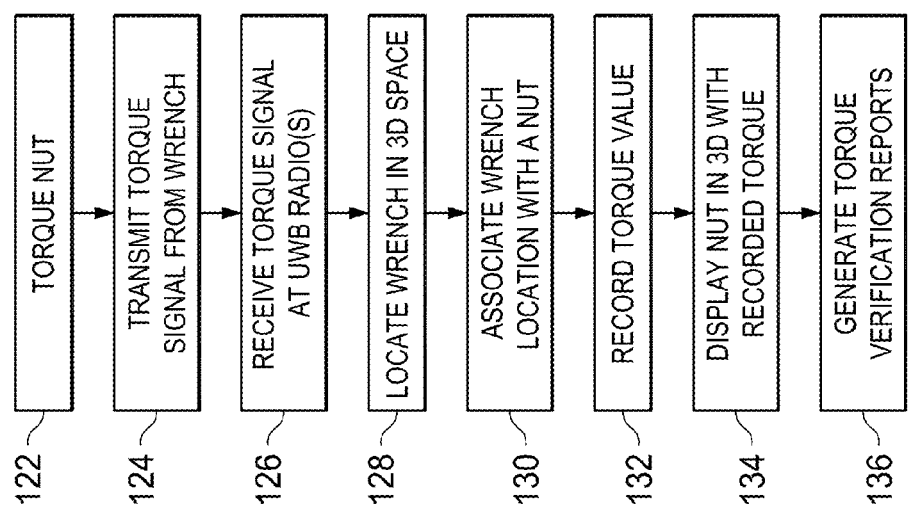
FIG. 11 is an illustration of a simplified flow diagram illustrating a method for locating and reporting the completion of manufacturing operations in accordance with an illustrative embodiment.

Referring to FIG. 11, according to a method embodiment, torquing of nuts 38 may be monitored, recorded, and displayed. Beginning at 122, a production worker uses electronic torque wrench 44 to torque a nut 38. When strain gauge sensor 50 (FIGS. 4 and 5) senses that the nominal or threshold torque value has been reached, electronic torque wrench 44 transmits torque signals comprising UWB pulse signals that contain the torque value, shown at step 124. The torque signals (UWB pulse signals) are received at UWB radios 60 within wheel well 36, as shown at 126. The resulting location measurements are then used by processor 66 to calculate the location of electronic torque wrench 44 in three dimensional object space, as shown at 128. At 130, processor 66 associates the wrench location with nut 38, and at 132, the torque value for nut 38 is recorded. At 134, processor 66 translates the location of nut 38 from three dimensional coordinate system 26 of wheel well 36, to coordinate system 34 of the three dimensional space represented by the displayed image. Nut 38 is then displayed along with the recorded torque value at 134. Torque verification reports may be optionally generated, as desired, at 136.

The disclosed embodiments described above may provide for the acquisition and display of both the location and quantitative data relating the manufacturing operation that is performed. For example, where electronic torque wrench 44 transmits signals that identify its location and a torque reading, both the location of electronic torque wrench 44 and the acquired torque reading may be remotely or locally recorded and displayed. However, the disclosed embodiments may also be useful where the signals transmitted from electronic torque wrench 44 contain only information indicating the location of electronic torque wrench 44. For example, when a worker initiates and/or completes a torquing operation, he or she may manually initiate the transmission of a signal from electronic torque wrench 44 using a transmit switch (not shown) on electronic torque wrench 44 which initiates transmission of a signal that indicates the location of the wrench, and inferentially, that an operation has just been initiated or taken place on a fitting at the location of the wrench.

Figure 13:
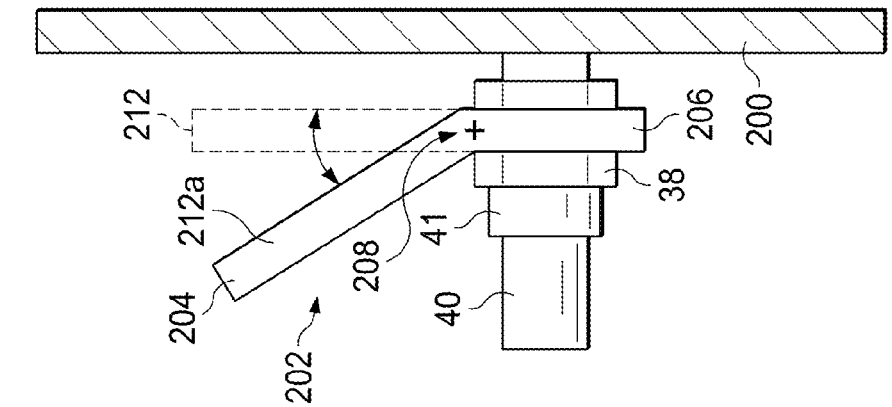
FIG. 13 is an illustration of a view similar to FIG. 12 but depicting the use of a torque wrench having a flexible head to avoid the obstruction in accordance with an illustrative embodiment.
Figure 12:
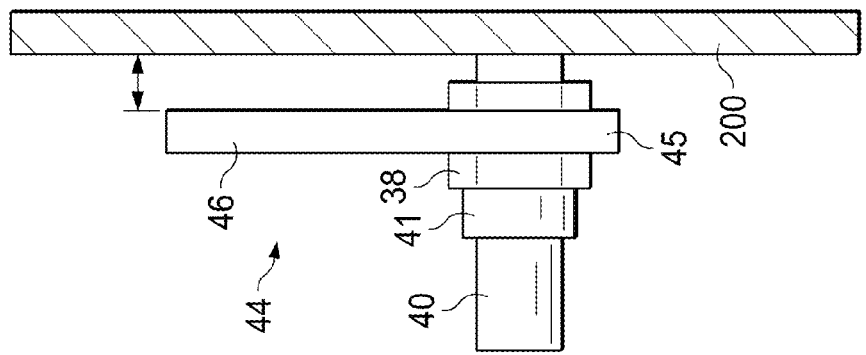
FIG. 12 is an illustration of a side view of a fixed-head torque wrench placed on a fastener in proximity to an obstruction allowing limited handle clearance in accordance with an illustrative embodiment.

Referring now to FIG. 12, head 45 of electronic torque wrench 44 may be positioned around nut 38 used to tighten one of threaded fittings 41 on tube 40. The position of handle 46 is fixed relative to head 45. In this example, handle 46 of electronic torque wrench 44 is closely positioned next to obstruction 200 which may comprise, for example and without limitation, a bulkhead in which the clearance space "C" is insufficient for a worker to grasp handle 46. One solution to this problem is shown in FIG. 13 which illustrates electronic torque wrench 202 in which handle 204 is pivotally connected to head 206 by means of hinge 208, and thus may be referred to as having a "flexible" head 206. By virtue of the pivotal connection formed by hinge 208, handle 204 may be swung through any angle $\theta$ so that a worker may freely grasp and rotate handle 204, free of obstruction 200.

Figure 14:
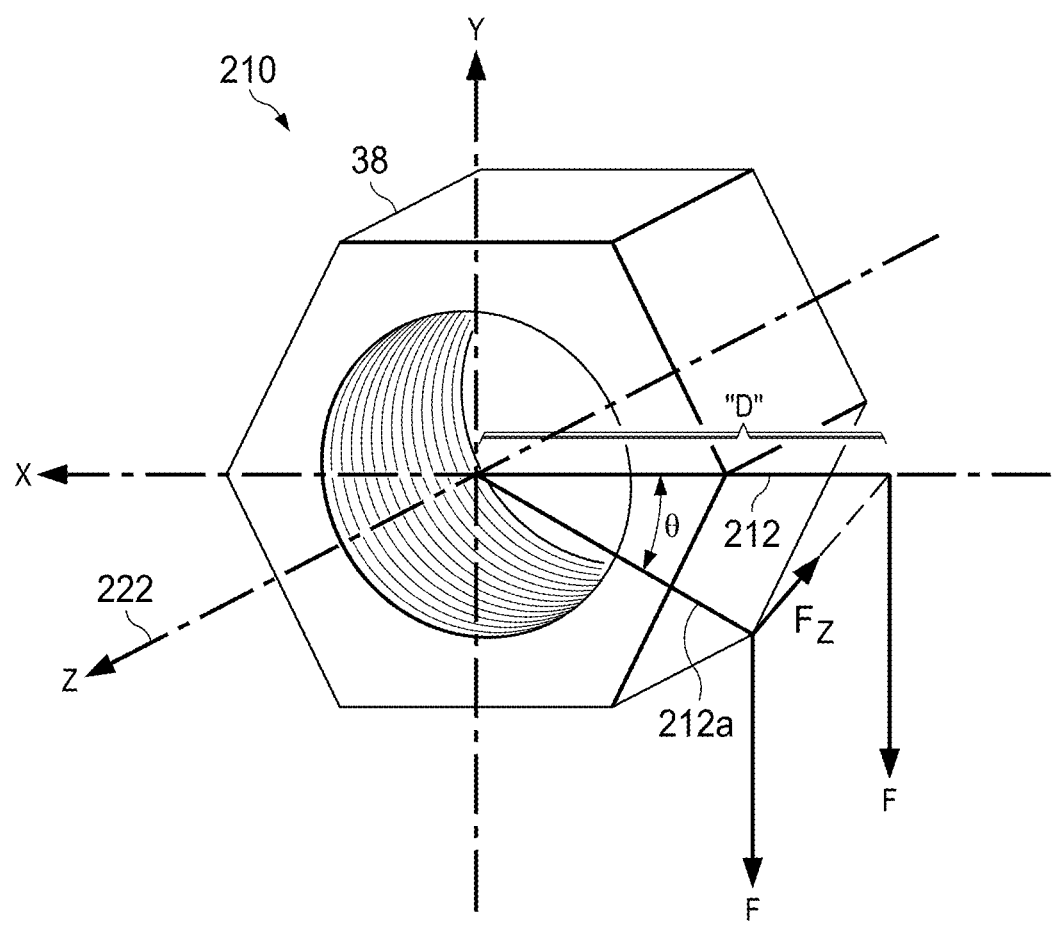
FIG. 14 is an illustration of a perspective view of a nut illustrating the forces applied to the nut by a torque wrench in accordance with an illustrative embodiment.

Attention is also now directed to FIG. 14 which illustrates the forces applied to one of nuts 38 using electronic torque wrench 202 shown in FIG. 13. The symmetry of nut 38 may be defined in three dimensional coordinate system 210 comprising orthogonal x, y, and z axes. The z axis forms the axis of rotation 222 of fastener 38. The rotational force, i.e., torque, which produces rotation of nut 38 is applied to fastener 38 within a plane defined by the x and y axes and which is orthogonal with respect to the axis of rotation 222. When handle 204 of electronic torque wrench 202 is axially aligned with head 206 as shown by dashed line position 212 in FIG. 13, the force F applied to handle 204 acts through a distance "D" within the x-y plane to produce a torque which is the product of F×D. When, however, handle 204 is swung to full line (FIG. 13) position 212a through an angle $\theta$, a portion of the applied force F results in an "off axis" force component $F_z$ parallel to the z axis. The off-axis force component $F_z$ may result in an error in torque measurement. In other words, when the force F is not applied entirely within the x-y plane orthogonal to the axis of rotation 222, the torque readings may contain an error. This error is sometimes referred to as the "cosine error" since the magnitude of the error is proportional to the cosine of the angle $\theta$.

Figure 15:
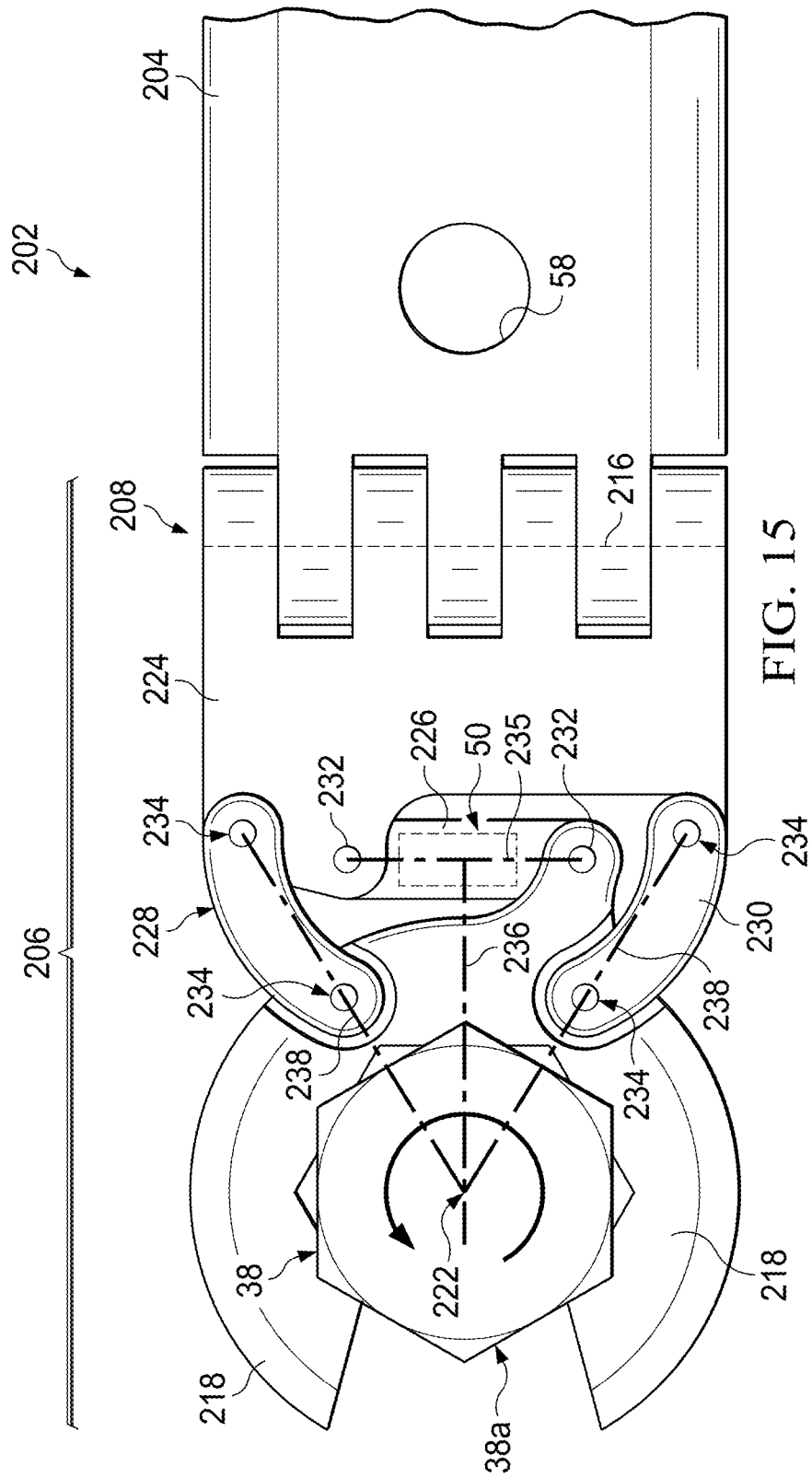
FIG. 15 is an illustration of a top view of a portion of an electronic torque wrench, shown engaging a fastener in accordance with an illustrative embodiment.
Figure 16:
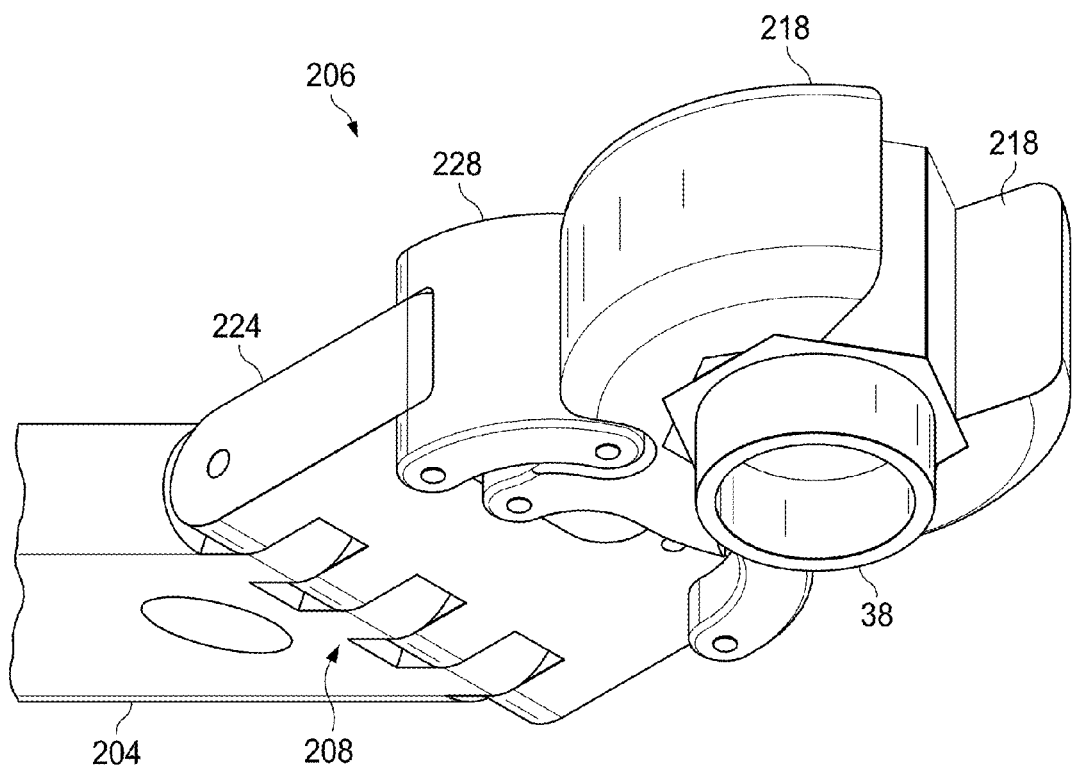
FIG. 16 is an illustration of a perspective view of the torque wrench shown in FIG. 15 in accordance with an illustrative embodiment.
Figure 17:
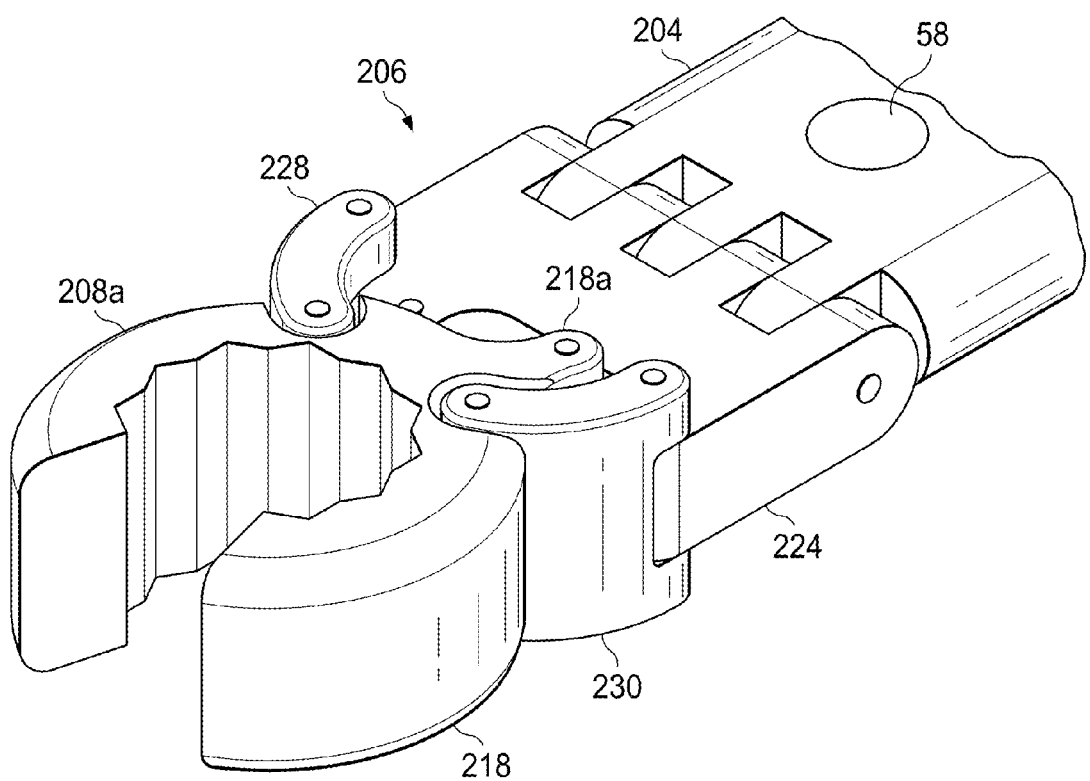
FIG. 17 is an illustration of another perspective view of the torque wrench shown in FIGS. 15 and 16, but without the fastener in accordance with an illustrative embodiment.

Attention is now directed to FIGS. 15-17 which depict features of electronic torque wrench 202 that may substantially eliminate cosine error. Electronic torque wrench 202 broadly comprises handle 204 pivotally connected to head 206 by means of hinge 208 that allows pivotal motion of handle 204 about axis 216. Thus, hinge 208 allows handle 204 to be swung or pivoted through an angle θ, out of the x-y plane shown in FIG. 14, to any of a plurality of positions in those applications where it may be necessary to avoid obstruction 200 (FIG. 13).

Head 206 broadly comprises first head portion 218 that engages nut 38 and second head portion 224 pivotally connected to the end of handle 204 by means of hinge 208. In the illustrated example, first head portion 218 comprises opposing jaws which engage flats 38a of nut 38; however, first head portion 218 may have other geometries such as a socket configuration (not shown), depending on the application. First and second head portions 218 and 224 are pivotally connected by means of torque reacting first link 226, and second and third connecting links 228 and 230.

Torque reacting first link 226 is elongate and has its opposite ends respectively pivotally connected at pivot points 232 to ear 218a on first head portion 218, and to second head portion 224. Torque reacting first link 226 has longitudinal axis 235 which passes through pivot points 232 and extends perpendicular to reference line 236 passing through rotational axis 222 of nut 38. Connecting links 228 and 230 are positioned on opposite sides of torque reacting first link 226 and each have their opposite ends pivotally connected at pivot points 234, respectively to first and second head portions 218 and 224. Reference lines 238 connecting the pivot points 234 of each of connecting links 228 and 230 each pass through rotational axis 222.

Although the connecting links 228 and 230 are positioned on opposite sides of torque reacting first link 226 in the illustrated example, other arrangements are possible; for example, connecting links 228 and 230 may be mounted on the same side of torque reacting first link 226, or may lie in different planes. It should also be noted here that the use of more than two connecting links 228 and 230 may be possible or desirable in some applications. While hinge 208 employs pivotal connections formed by connecting links 228 and 230, other types of flexible connections may be possible, using for example and without limitation, ball joints (not shown) and/or sliding joints (not shown).

Strain gauge sensor 50 is mounted on torque reacting first link 226 and functions to measure the amount of strain created in torque reacting first link 226 as a result of the force transmitted from second head portion 224 to first head portion 218 solely through torque reacting first link 226. While strain gauge sensor 50 has been illustrated in the disclosed embodiment, other types of sensors (not shown) may be employed to measure the torque transmitted through torque reacting first link 226.

From the forgoing description, it may be appreciated that torque reacting first link 226 along with strain gauge sensor 50 provide a means, located entirely within head 206 for measuring the amount of torque applied to fastener 38. As a result of this arrangement, the measured torque readings are substantially unaffected by the pivotal position of handle 204.

In operation, a force applied to handle 204 is transmitted through hinge 208 to second head portion 224, which transmits the applied force through links 226, 228, and 230 to first head portion 218 where it is applied to fastener 38. Torque reacting first link 226 essentially isolates that portion of the force applied to fastener 38 that results in a torque on fastener 38, i.e., the force applied to fastener 38 that is perpendicular to the axis of rotation 222, from the component $F_z$ of the force that is applied "off-axis", i.e., not perpendicular to the axis of rotation 222. The off-axis component $F_z$ of the force applied to the fastener 38 is transmitted substantially entirely through the second and third connecting links 228 and 230. Connecting links 228 and 230 thus form pivotal connections that hold torque reacting first link 226 in a substantially fixed position on electronic torque wrench 202, and react against the off-axis component $F_z$ of the applied force F.

Electronic torque wrench 202 may be similar in other respects to electronic torque wrench 44 shown in FIGS. 4 and 5. For example and without limitation, electronic torque wrench 202 may include measuring/trigger circuit 57 which functions to cause UWB pulse signal transmitter 52 in handle 204 to transmit wireless signals indicating the location and/or magnitude of the sensed torque. Similarly, electronic torque wrench 202 may include annunciator 58 which may comprise, for example and without limitation, the LED shown in the drawings.

Figure 18:
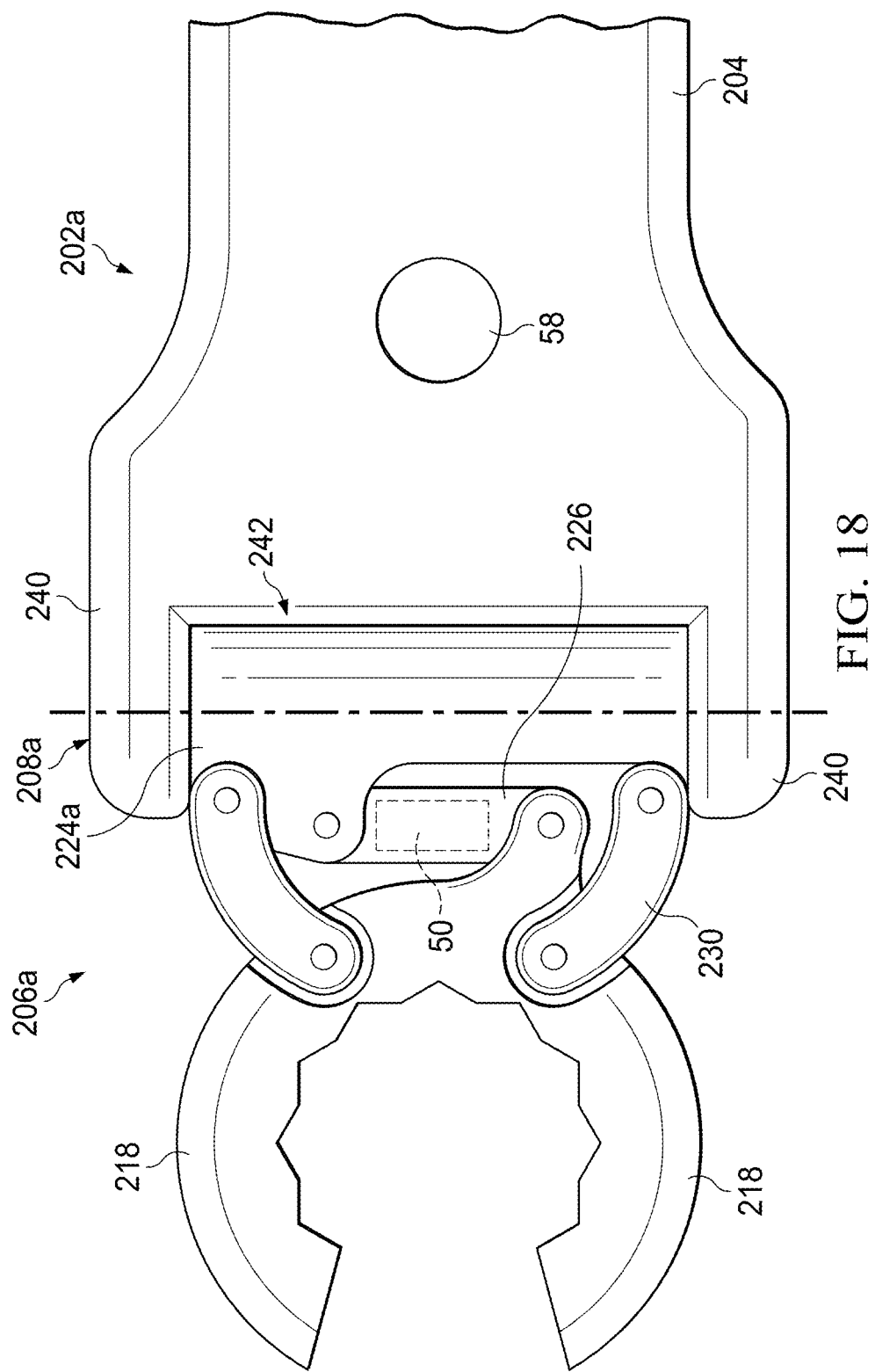
FIG. 18 is an illustration of a top view of another embodiment of the electronic torque wrench in accordance with an illustrative embodiment.
Figure 19:
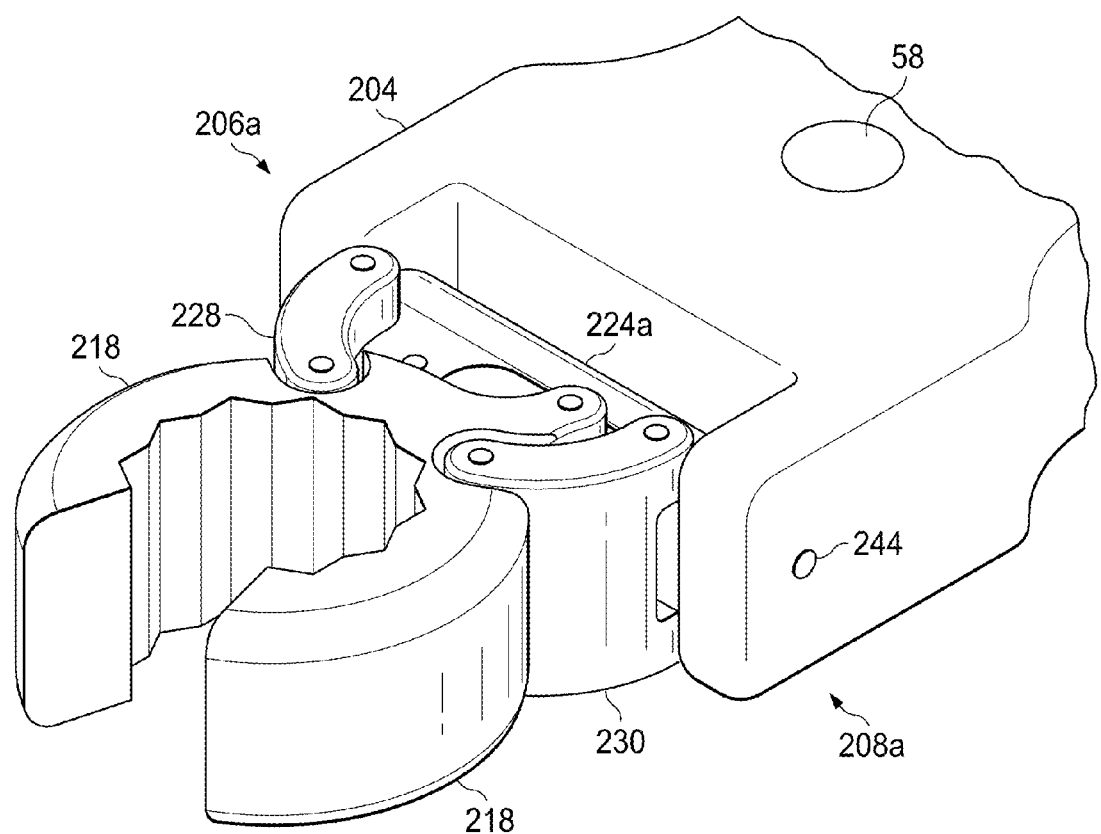
FIG. 19 is an illustration of a perspective view of the electronic torque wrench shown in FIG. 18 in accordance with an illustrative embodiment.

An alternate embodiment of electronic torque wrench 202a is illustrated in FIGS. 18 and 19. Electronic torque wrench 202a is similar to that previously described in connection with FIGS. 15-17, but includes an alternate form of hinge 208a wherein second head portions 224a is configured to be received within opening 242 defined between spaced apart tines 240 that are integrally formed with the end of handle 204. Pins 244 pivotally connect the opposite ends of second head portion 224a with tines 240.

Figure 20:
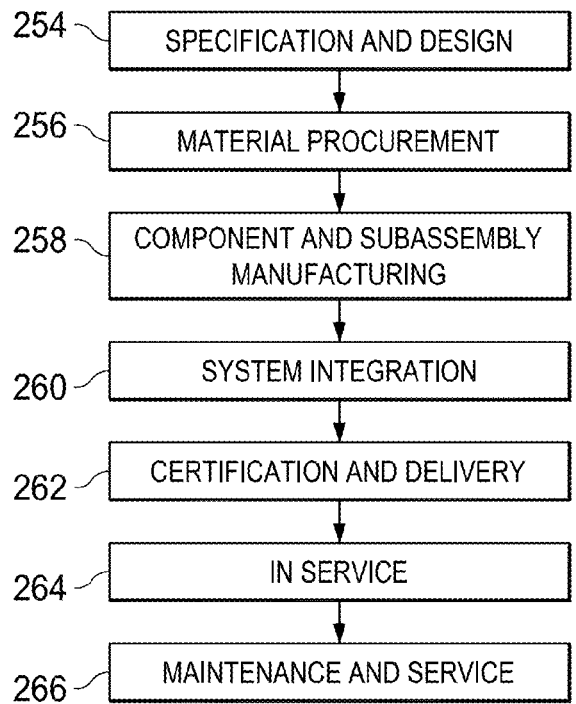
FIG. 20 is an illustration of a flow diagram of aircraft production and service methodology in accordance with an illustrative embodiment.
Figure 21:
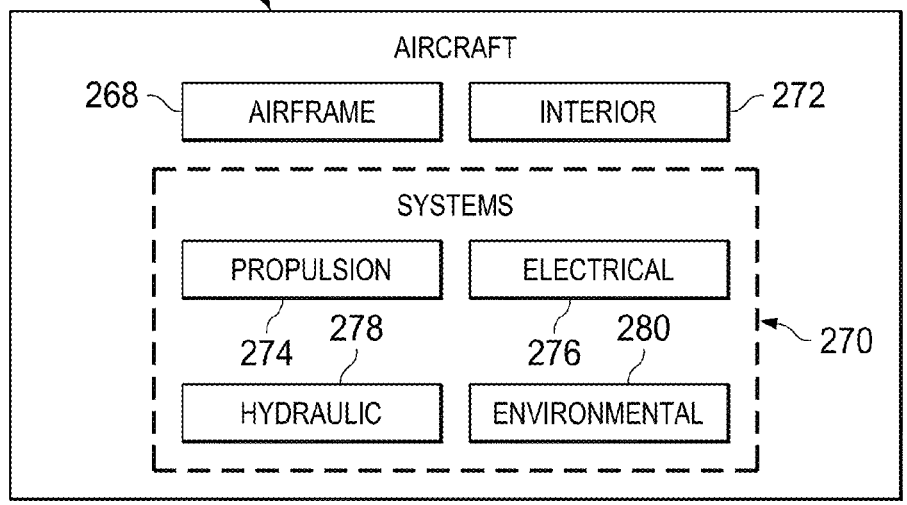
FIG. 21 is an illustration of a block diagram of an aircraft in accordance with an illustrative embodiment.

Embodiments of the disclosure may find use in a variety of potential applications, particularly in the transportation industry, including for example, aerospace, marine and automotive applications. Thus, referring now to FIGS. 20 and 21, embodiments of the disclosure may be used in the context of aircraft manufacturing and service method 250 as shown in FIG. 20 and aircraft 252 as shown in FIG. 21. During pre-production, aircraft manufacturing and service method 250 may include specification and design 254 of aircraft 252 and material procurement 256. During production, component and subassembly manufacturing 258 and system integration 260 of aircraft 252 takes place. Thereafter, aircraft 252 may go through certification and delivery 262 in order to be placed in service 264. While in service by a customer, aircraft 252 is scheduled for routine maintenance and service 266 (which may also include modification, reconfiguration, refurbishment, and so on).

Each of the processes of aircraft manufacturing and service method 250 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 21, aircraft 252 produced by aircraft manufacturing and service method 250 may include airframe 268 with plurality of systems 270 and interior 272. Examples of high-level systems 270 include one or more of propulsion system 274, electrical system 276, hydraulic system 278, and environmental system 280. Any number of other systems may be included. Although an aerospace example is shown, the principles of the disclosure may be applied to other industries, such as the marine and automotive industries.

Systems and methods embodied herein may be employed during any one or more of the stages of aircraft manufacturing and service method 250. For example, components or subassemblies corresponding to production process 258 may be fabricated or manufactured in a manner similar to components or subassemblies produced while aircraft 252 is in service. Also, one or more apparatus embodiments, method embodiments, or a combination thereof may be utilized during the production stages 258 and 260, for example, by substantially expediting assembly of or reducing the cost of aircraft 252. Similarly, one or more of apparatus embodiments, method embodiments, or a combination thereof may be utilized while aircraft 252 is in service, for example and without limitation, to maintenance and service 266.

Figure 22:
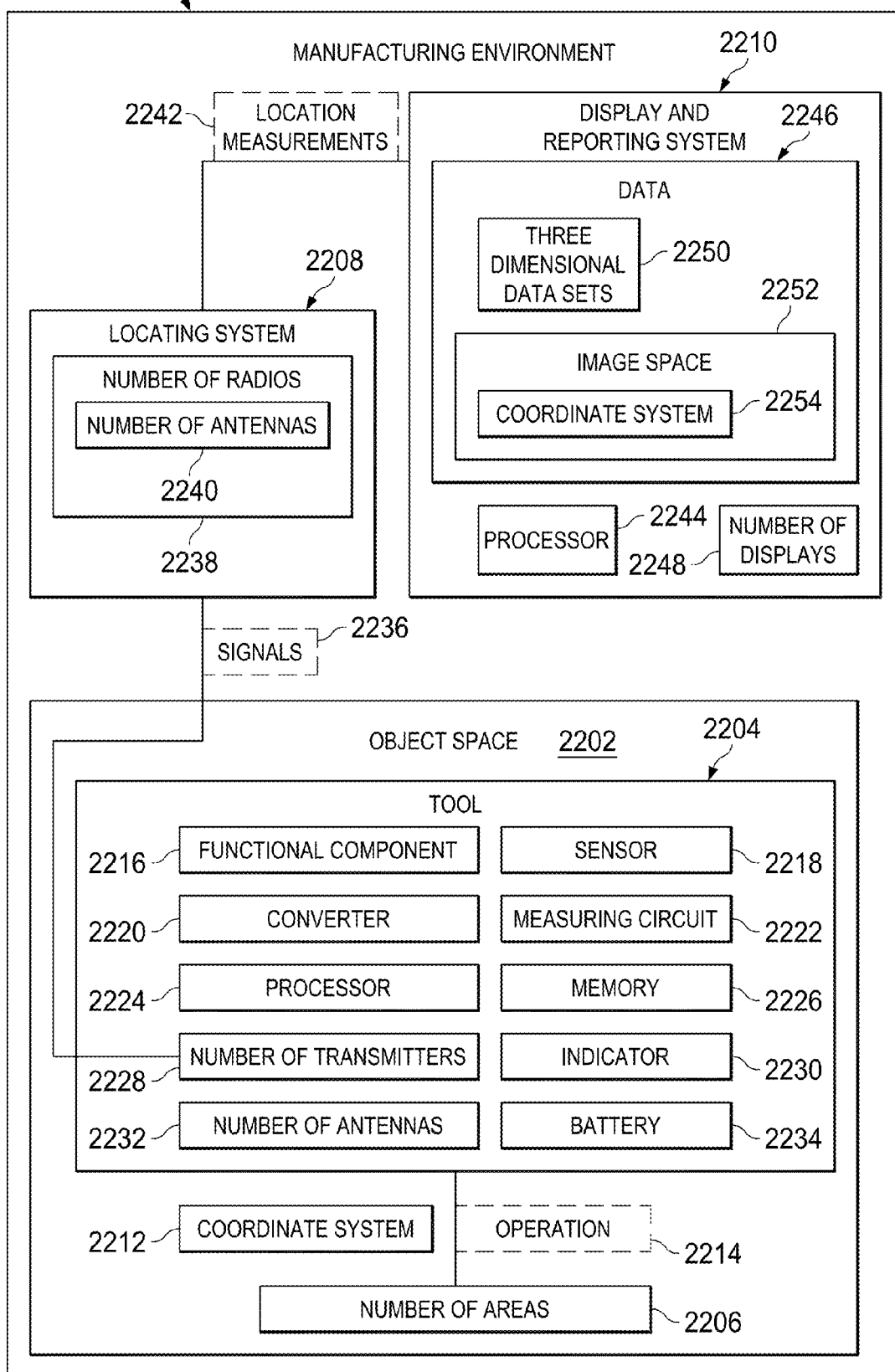
FIG. 22 is an illustration of a manufacturing environment in the form of a block diagram in accordance with an illustrative embodiment.

Turning now to FIG. 22, an illustration of a manufacturing environment in the form of a block diagram is depicted in accordance with an illustrative embodiment. In FIG. 22, manufacturing environment 2200 is an illustrative example of an environment in which the different illustrative embodiments may be implemented to monitor implementation and completion of operations. Although depicted as manufacturing environment 2200, this environment may comprise other types of environments such as operating environments, repair environments, maintenance environments, or other suitable environment.

Manufacturing environment 2200 is an example of manufacturing environment 24 of FIG. 1. As depicted manufacturing environment 2200 includes object space 2202, tool 2204, number of areas 2206, locating system 2208, and display and reporting system 2210.

A "number" as used herein with reference to items means one or more items. For example, a number of areas is one or more areas.

In this illustrative example, object space 2202 is the three-dimensional physical environment in which tool 2204 and number of areas 2206 is present. Object space 2202 includes coordinate system 2212. Coordinate system 2212 is a system which uses values, or coordinates, to identify the position of a point in object space 2202.

For example, a first area in number of areas 2206 may have a unique set of coordinates to identify the location of the first area within object space 2202. Likewise, tool 2204 may have a set of coordinates to identify the location of tool 2204 within object space 2202 at a given time. Tool 2204 may move within object space 2202 in relation to number of areas 2206 and other objects within object space 2202. However, the location of tool 2204 at various times may be identified within object space 2202 using coordinate system 2212 to identify the relationship of tool 2204 to number of areas 2206.

In this illustrative example, tool 2204 includes functional component 2216, sensor 2218, converter 2220, measuring circuit 2222, processor 2224, memory 2226, number of transmitters 2228, indicator 2230, number of antennas 2232, and battery 2234. Tool 2204 is configured to perform operation 2214 on number of areas 2206 using functional component 2216. For example, tool 2204 may be a torque wrench such as electrical torque wrench 44 of FIG. 4. In this illustrative example, functional component 2216 may be an opening such as jaws 48 of FIG. 4. Number of areas 2206 may comprise a number of surfaces, a number of parts, a number of holes, or any other types of areas which could receive operation 2214. In this illustrative example, number of areas 2206 may comprise a number of torque nuts to be torqued, such as torque nut 38 of FIG. 14. In this illustrative example, operation 2214 may be torquing a nut to a proscribed or desired value using a torque wrench. The desired value may be a value to satisfy specifications. In one illustrative example, the desired value may be 45 foot pounds torque.

As depicted tool 2204 may be selected from at least one of a torque wrench, an inspection tool, a hole-measuring device, a drill, a lubricant applicator, a surface finish applicator, heating equipment, and other types of equipment. Functional component 2216 may be selected based on tool 2204 and operation 2214. Functional component 2216 may be selected from at least one of jaws, a wrench head, an energy emitter, a shaped insertion portion, caliper jaws, a drill bit, a spray applicator, a brush applicator, a heating pad, and other types of equipment. Operation 2214 may be selected from at least one of torquing, drilling, measuring, inspecting, applying, spraying, transporting, heating, and other types of operations.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

Sensor 2218 is configured to measure a physical property related to operation 2214. As depicted sensor 2218 may be selected from at least one of a strain gauge, a temperature sensor, a pressure sensor, or other sensing equipment. In one illustrative example, tool 2204 is a torque wrench and sensor 2218 is a strain gauge configured to measure the amount of torque applied to a nut. In another illustrative example, tool 2204 is a hole measuring device and sensor 2218 is a contact displacement sensor. In yet another illustrative example, tool 2204 is an electronic caliper and sensor 2218 is a capacitance reader.

Converter 2220 is configured to convert or change an analog output of sensor 2218 to a digital output. Digital output from converter 2220 may then be sent to other components of tool 2204 for further processing.

Measuring circuit 2222 is configured to receive and measure the digital signal from converter 2220. Measuring circuit 2222 may then send the measured value of the digital signal to processor 2224, memory 2226, or another component of tool 2204 for further processing.

In some illustrative examples, measuring circuit 2222 may also function as a triggering circuit. In these illustrative examples, measuring circuit 2222 may issue a trigger signal to number of transmitters 2228 or indicator 2230. Measuring circuit 2222 may send a trigger signal to number of transmitters 2228 to transmit when the measured value meets or exceeds a threshold value. In one illustrative example, the threshold value may be a nominal or nonzero value. In this illustrative example, when operation 2214 begins, sensor 2218 produces a nonzero output and number of transmitters 2228 receives a trigger signal from measuring circuit 2222. Thus number of transmitters 2228 transmits while tool 2204 conducts operation 2214.

In another illustrative example, threshold value may be configured to trigger number of transmitters 2228 to transmit upon completion of operation 2214 by tool 2204. In this illustrative example, the threshold value may be a desired value for completion of operation 2214. In one illustrative example, the threshold value may be the desired torque to be applied to a nut during operation 2214.

In one illustrative example, tool 2204 may have a single transmitter. In another illustrative example, tool 2204 has two transmitters separated by a known distance. The distance between functional component 2216 and a transmitter of number of transmitters 2228 may be a known distance. The location of the area in number of areas 2206 receiving operation 2214 may be identified based on the location of a transmitter of number of transmitters 2228 and the known distance.

Number of transmitters 2228 is configured to transmit signals 2236 from tool 2204 using number of antennas 2232. In one illustrative example, signals 2236 are pulse signals. A pulse signal is a signal with a rapid change in a characteristic of the signal from a baseline to a higher or lower value followed by a return to the baseline value. Number of transmitters 2228 may be a number of radio frequency pulse transmitters. In one illustrative example, number of transmitters 2228 transmits ultra wide band pulse signals. As used herein, ultra wide band includes frequencies with the range of 3.1 to 10.6 GHz. When number of transmitters 2228 includes more than one transmitter, each transmitter in number of transmitters 2228 may use a method to differentiate pulse signals from each transmitter in the number of transmitters 2228 from the pulse signals sent by the other transmitters in the number of transmitters 2228. Methods may include transmitting a pulse signal with a different frequency range than the other transmitters, different pulse width than the other transmitters, unique pulse leading edge or trailing edge data pattern than the other transmitters, or other methods which differentiate pulse signals from each transmitter in the number of transmitters 2228 from the pulse signals sent by the other transmitters in the number of transmitters 2228.

In one illustrative example, signals 2236 may act as a beacon signal. In this illustrative example, signals 2236 are pulse signals and number of transmitters 2228 transmits signals 2236 continuously. In this illustrative example, transmitting continuously means continued transmission over a period of time. Although signals 2236 are broadcast continuously, there may be time in between each signal. In other words, there may be times when no signal is currently transmitted.

In this illustrative example, a beacon signal is similar to a weather beacon on top of a tall building. In a weather beacon, a light flashes or pulses on and off continuously. This flashing indicates to aircraft the location of a tall building. Because the light flashes, the light is not always lit, however the transmission is continuous.

Beacon signals may be used to determine information associated with tool 2204. In this illustrative example, signals 2236 can be used to determine if tool 2204 is present in manufacturing environment 2200, the location of number of transmitters 2228, if tool 2204 is performing operation 2214, direction of movement of tool 2204 in manufacturing environment, and other information related to tool 2204. Transmission of signals 2236 by number of transmitters 2228 as a beacon signal may be triggered in several ways. In one illustrative example, a button on tool 2204 may be activated to trigger number of transmitters 2228. In another illustrative example, entering manufacturing environment 2200 may trigger number of transmitters 2228. In this illustrative example, even if tool 2204 is not performing operation 2214, number of transmitters 2228 transmits signals 2236. Thus the location of tool 2204 within object space 2202 can be identified even when tool 2204 is not performing operation 2214.

In another illustrative example, signals 2236 are pulse signals and number of transmitters 2228 transmits signals 2236 in response to operation 2214. In this illustrative example, number of transmitters 2228 may be triggered by measuring circuit 2222, processor 2224, activating button on tool 2204, or another triggering mechanism. Measuring circuit 2222 or processor 2224 may trigger number of transmitters 2228 in response to a value of sensor data meeting or exceeding a threshold value. By triggering number of transmitters 2228 in response to operation 2214, signals 2236 are transmitted during operation 2214. Thus signals 2236 may be used to determine characteristics of operation 2214. Characteristics of operation 2214 may be selected from at least one of direction of movement, speed of movement, distance of movement, consistency of operation, and type of operation, and other aspects of operation 2214.

Further, transmission of signals 2236 during movement of tool 2204 may enhance the accuracy of identifying the location of number of transmitters 2228. Movement of number of transmitters 2228 provides multiple paths for signals 2236 to reach locating system 2208. Additionally, in illustrative examples in which tool 2204 rotates around the area receiving operation 2214, arcs may be traced along the movement of number of transmitters 2228. These arcs may be used to derive the location of functional component 2216.

In yet another illustrative example, signals 2236 are pulse signals and number of transmitters 2228 transmits signals 2236 in response to completion of operation 2214. In this illustrative example, number of transmitters 2228 may be triggered by measuring circuit 2222, processor 2224, activating a button on tool 2204, or another triggering mechanism.

Signals 2236 contain data. Data within signals 2236 may be selected from at least one of time of transmission of signal, type of tool, identity of transmitter, known distance from functional component, data from sensor, data from other sources, type of area to receive operation, and other types of data. Data contained in signals 2236 may be used to generate location measurements in locating system 2208. Data contained in signals 2236 may be used to calculate location of tool 2204 within object space 2202. Data contained in signals 2236 may be used to calculate location of functional component in object space 2202.

Indicator 2230 is configured to indicate the completion of a function. As depicted indicator 2230 may be selected from at least one of a number of LED lights, an audio signal generator, a vibrator, or other indicating equipment. Indicator 2230 may be an annunciator such as annunciator 58 of FIG. 4. Indicator 2230 presents a message or indication following completion of a function. Indicator 2230 may indicate at least one of completion of operation 2214 on an area in number of areas 2206, receipt of signals 2236 by locating system 2208, identification of the location of tool 2204 within object space 2202, identification of the location of an area in number of areas 2206 by display and reporting system 2210, and notice of completion of operation 2214 by display and reporting system 2210.

Indicator 2230 indicates completion of operation 2214 on an area in number of areas 2206 to signal to the operator to stop operation 2214. In one illustrative example, tool 2204 is a torque wrench. In this illustrative example, indicator 2230 indicates to the operator of tool 2204 that the desired application of torque has been reached and the operator may stop applying torque.

Indicator 2230 indicates completion of other functions by locating system 2208 and display and reporting system 2210 to signal to an operator of tool 2204 that tool 2204 may be moved to another area in number of areas 2206. If an operator of tool 2204 were to move tool 2204 without receiving an indication, operator may perform operation 2214 on several areas of number of areas 2206 without locating system 2208 or display and reporting system 2210 receiving necessary data. Operator of tool 2204 would then have to repeat operation 2214 on the several areas of number of areas 2206 for locating system 2208 and display and reporting system 2210 to receive the necessary data to mark operation 2214 as complete for the several areas of number of areas 2206.

In one illustrative example, indicator 2230 is two lights on tool 2204. The two lights of indicator 2203 may be, for example, light emitting diode lights. Upon completion of operation 2214, a first light of indicator 2230 may illuminate to indicate completion of operation 2214. The second light of indicator 2230 may illuminate upon completion of calculations by display and reporting system 2210 for operation

2214. After illumination of the second light of indicator 2230, operator of tool 2204 may then move tool 2204 within object space 2202 to another area to perform operation 2214.

In another illustrative example, indicator 2230 is a single light. The light may illuminate in different colors to indicate completion of different functions. In one illustrative example, light of indicator 2230 illuminates red upon completion of operation 2214. Light of indicator 2230 may later illuminate green upon completion of calculations by display and reporting system 2210. In this illustrative example, different colors are used to indicate completion of different functions. In another illustrative example, number of flashes of the light or length of flashes of the light may be used to indicate completion of different functions.

In another illustrative example, indicator 2230 is a combination of a light and another alert generator. Alert generator may be, for example, an audio signal generator, a vibrator, or some other suitable alert generation device. Upon completion of operation 2214 the alert generator may signal to the operator to stop performing operation 2214 as a desired value has been reached. The light may illuminate upon completion of functions by locating system 2208 or display and reporting system 2210.

Data regarding operation 2214 may be saved in memory 2226. Data regarding performance of operation 2214 may be selected from at least one of beginning time of operation 2214, completion time of operation 2214, data from sensor 2218 during operation 2214, data transmitted in signals 2236 regarding operation 2214, and other data. Memory 2226 may contain data regarding the type of operation such as type of tool 2204, the desired value for operation 2214, type of area to receive operation 2214, and other data regarding type of operation for operation 2214. Memory 2226 may also store data received from sources outside of tool 2204 such as data received from display and reporting system 2210 or locating system 2208.

Electronic components of tool 2204, including transmitter 2228, processor 2224, and indicator 2230, may be powered by battery 2234. Battery 2234 may also be used by functional component 2216 to perform operation 2214. In some illustrative examples, an alternative power source such as a power cord may be used instead of battery 2234.

Tool 2204 may also include other optional sensors. In one illustrative example, tool 2204 may include a gyroscopic sensor. The gyroscopic sensor may generate data regarding the direction tool 2204 is facing within object space 2202.

In these illustrative examples, data from optional sensors in tool 2204 may be sent in signals 2236. Data from optional sensors in tool 2204 may also be saved in memory 2226. Data from the optional sensors may be used to supplement location measurements 2242 in identifications of location of number of transmitters 2228 by display and reporting system 2210. Data from the optional sensors may also be used to supplement data from sensor 2218.

As depicted locating system 2208 has number of radios 2238 which has number of antennas 2240. Number of radios 2238 may receive signals 2236 sent by number of transmitters 2228 using number of antennas 2232. Locating system 2208 determines location measurements 2242 from signals 2236. Location measurements 2242 may include angle of arrival (AOA), time difference of arrival (TDOA), time of arrival (TOA), or other measurements.

Number of radios 2238 may be a wired system, a wireless system, or a combination of wired and wireless. In a wired system, number of radios 2238 is a number of receivers. In a wireless system, number of radios 2238 is a number of wireless transceivers.

In locating system 2208 one radio in number of radios 2238 acts as a synchronizing radio. Synchronizing number of radios 2238 causes number of radios 2238 to operate on the same internal time.

Number of radios 2238 is configured within object space 2202 such that each area in number of areas 2206 is within line of sight of at least two radios in number of radios 2238. Although two radios is the suggested minimum number of radios within line of sight of an area within number of areas 2206, more radios may fit this criteria. In one illustrative example, each area in number of areas 2206 is in line of sight of at least four radios in number of radios 2238.

Signals 2236 received by radios in number of radios 2238 which are not in line of sight of the area receiving operation 2214 have reflected off of objects within object space 2202 before reaching the radios. Using measurements of signals 2236 from radios in number of radios 2238 which are not within line of sight introduces noise into the calculations. Thus, measurements taken by radios in number of radios 2238 which are not in line of sight of the area receiving operation 2214 may be ignored in calculations by display and reporting system 2210.

Locating system 2208 transmits location measurements 2242 to display and reporting system 2210 using wireless or wired means. Display and reporting system 2210 is configured to identify location of tool 2204 in object space 2202 based on location measurements 2242. Display and reporting system 2210 is also configured to identify the location of the area of number of areas 2206 receiving operation 2214 based on the location of number of transmitters 2228 in object space 2202.

As used herein, identify may comprise to ascertain or determine. Identification may be performed based on at least one of calculations, comparisons, logic, or other suitable processes. Identification may be performed using a number of inputs. Identification may use an input directly or indirectly.

In one illustrative example, an identification may directly use an input of location measurements 2242 to identify a location of a transmitter in number of transmitters 2228 in object space 2202. In this identification, location measurements 2242 may be used in calculations or determinations to identify a location of a transmitter in number of transmitters 2228 in object space 2202.

In another illustrative example, an identification may indirectly use an input of location measurements 2242 to identify a location of the area of number of areas 2206 receiving operation 2214. In this illustrative example, location measurements 2242 may not be used directly in calculations or determinations to identify a location of the area of number of areas 2206 receiving operation 2214. Instead, location measurements 2242 may be used to identify a location of a transmitter in number of transmitters 2228 in object space 2202. The location of the transmitter in number of transmitters 2228 in object space 2202 may then be used to identify a location of the area of number of areas 2206 receiving operation 2214. In this illustrative example, location measurements 2242 were used indirectly to identify a location of the area of number of areas 2206 receiving operation 2214.

Display and reporting system 2210 may be implemented in software, hardware, or a combination of the two. When software is used, the operations performed by display and reporting system 2210 may be implemented in program code configured to run on a processor unit. When hardware is employed, the hardware may include circuits that operate to perform the operations in display and reporting system 2210.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

As depicted display and reporting system 2210 contains processor 2244, data 2246, and number of displays 2248. Processor 2244 may be configured to identify location of number of transmitters 2228 of tool 2204 in object space 2202 based on location measurements 2242. Processor 2244 may identify location of number of transmitters 2228 using all of location measurements 2242 or a subset of location measurements 2242. In one illustrative example, processor 2244 performs algorithms on location measurements 2242 to eliminate measurements in location measurements 2242 which may have been collected from radios in number of radios 2238 which are not within line of sight of the area receiving operation 2214. Using known locations of number of radios 2238 and location measurements 2242, processor 2244 identifies the location of number of transmitters 2228 in object space 2202.

Processor 2244 is also configured to identify the location of the area in number of areas 2206 receiving operation 2214. Location of the area in number of areas 2206 is identified based on the location of number of transmitters 2228. In one illustrative example, location of the area in number of areas 2206 is identified using location of number of transmitters 2228 in object space 2202. In this example, location of the area in number of areas 2206 is in coordinate system 2212 of object space 2202. Processor 2244 may later convert location of the area in number of areas 2206 in coordinate system 2212 to a location in another coordinate system, such as coordinate system 2254 of image space 2252.

In another illustrative example, location of the area in number of areas 2206 is identified based on location of number of transmitters 2228 in a different coordinate system, such as image space 2252 of data 2246. In this illustrative example, location of transmitters 2228 in coordinate system 2212 is converted to a location in coordinate system 2254 of image space 2252. Location of the area in number of areas 2206 is identified using location of number of transmitters 2228 in image space 2252. In this example, location of the area in number of areas 2206 is in coordinate system 2254 of image space 2252.

Processor 2244 may use additional data such as data 2246 to perform calculations, identifications, and determinations. As depicted data 2246 includes three dimensional data sets 2250 and image space 2252. Image space 2252 has coordinate system 2254.

Three dimensional data sets 2250 include schematics, representations, models, and other data for objects within object space. Three dimensional data sets 2250 may contain known locations of number of areas 2206. Three dimensional data sets 2250 may be displayed on number of displays 2248 of display and reporting system 2210. Three dimensional data sets 2250 may be used to generate three dimensional or two dimensional images representing object space 2202 for display on number of displays 2248.

Data 2246 also contains image space 2252. Image space 2252 is a representation of objects within object space 2202. As depicted image space 2252 may be selected from at least one of a three dimensional data set in three dimensional data sets 2250, a two dimensional image generated from three dimensional data sets 2250, a two dimensional image generated from three dimensional data sets 2250, or another suitable image. Coordinate system 2254 is a system which uses values, or coordinates, to identify the position of a point in image space 2252. Because image space 2252 is a representation of objects within object space 2202, a location in coordinate system 2212 of object space 2202 may be converted to a location in coordinate system 2254 of image space 2252.

Further, in one illustrative example, an area of number of areas 2206 receiving operation 2214 may be identified from three dimensional data sets 2250. Known locations of areas in number of areas 2206 are present in image space 2252. Based on an identified location of number of transmitters 2228 in image space 2252, areas in number of areas 2206 near the location may be identified. In this illustrative example, area in number of areas 2206 receiving operation 2214 may be identified based on distance from the identified location of number of transmitters 2228, type of area, type of tool, type of location, or other additional data.

Processor 2244 may also be configured to generate a notice of completion of operation. This notice of completion may also be referred to as a display of completion, a message of completion, or an indication of completion. Processor 2244 may be configured direct number of displays 2248 to indicate completion of operation 2214. Illustrative examples of notices of completion of operation 2214 are shown in FIG. 9 and FIG. 10.

Number of displays 2248 is configured to display data within display and reporting system 2210. Number of displays 2248 is in communication with processor 2244. Number of displays 2248 may be selected from at least one of a monitor, a handheld screen, a projector, an LED, a screen, or other types of displays. Number of displays 2248 may be present on tool 2204, on a wireless device, on a computer, projected onto a surface of manufacturing environment 2200, or other locations.

In an illustrative example, number of displays 2248 displays an image representing a portion of manufacturing environment 2200. In the image, number of areas 2206 may be identified with different colors. If an area of number of areas 2206 has received operation 2214, that area may be a different color than areas which have not received operation 2214.

Additionally, display and reporting system 2210 may be in communication with tool 2204. Display and reporting system may receive data sent by tool 2204, such as data from sensor 2218. Likewise, display and reporting system 2210 may send messages of completion to tool 2204 for display by indicator 2230.

The illustration of manufacturing environment 2200 in FIG. 22 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, display and reporting system 2210 may be present outside of manufacturing environment 2200. As a further example, if operation data is not stored at tool 2204, memory 2226 is not present.

Figure 23:
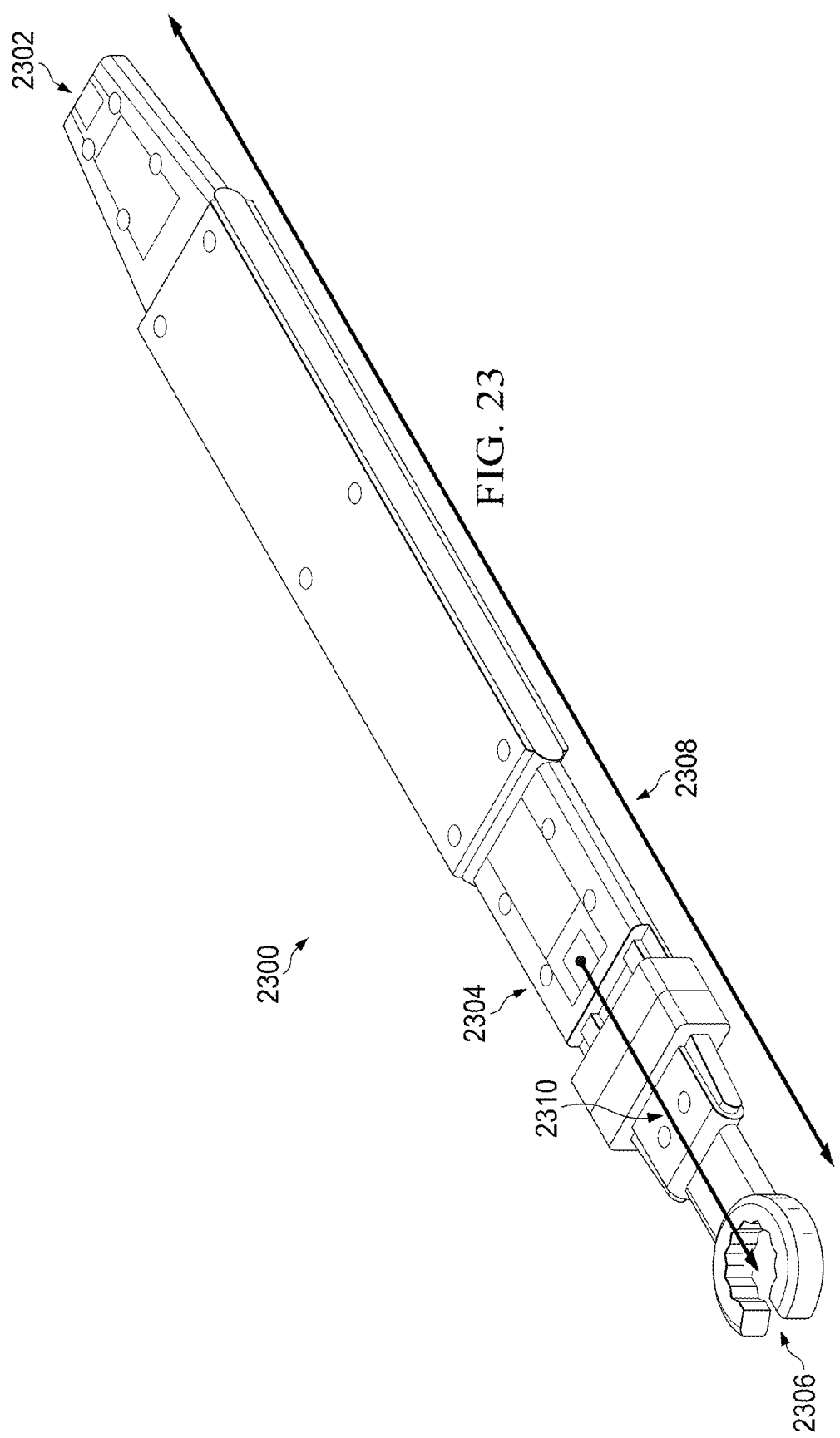
FIG. 23 is an illustration of a torque wrench in accordance with an illustrative embodiment.

Turning now to FIG. 23, an illustration of a torque wrench is depicted in accordance with an illustrative example. As depicted torque wrench 2300 is an example of tool 2204 of physical implementation of tool 2204 shown in block form in FIG. 22.

Torque wrench 2300 includes first transmitter 2302, second transmitter 2304, and functional component 2306. Vector 2308 is a line which can be drawn through first transmitter 2302, second transmitter 2304, and functional component 2306. Second transmitter 2304 and functional component 2306 are separated by distance 2310. Distance 2310 is a known distance.

Torque wrench 2300 may be used to perform operation 2214 in FIG. 22. In one illustrative example, torque wrench 2300 is used to torque a nut, such as nut 38 in FIG. 14. After completing the operation, first transmitter 2302 and second transmitter 2304 each transmit a signal. Using the signals, locations of first transmitter 2302 and second transmitter 2304 can be identified. Using locations of first transmitter 2302 and second transmitter 2304, orientation of torque wrench 2300 can be identified. Orientation of torque wrench 2300 may be selected from a relative position in an object space, a direction using the cardinal directions, a relative position in an image space, or other suitable orientation.

Vector 2308 can be drawn through the identified locations of first transmitter 2302 and second transmitter 2304. Using vector 2308 and distance 2310, location of functional component 2306 can be identified. Location of functional component 2306 can be used in determining the area receiving operation 2214.

The different components shown in FIG. 23 may be combined with components in FIG. 22, used with components in FIG. 22, or a combination of the two. Additionally, some of the components in FIG. 23 may be illustrative examples of how components shown in block form in FIG. 22 can be implemented as physical structures.

Figure 24:
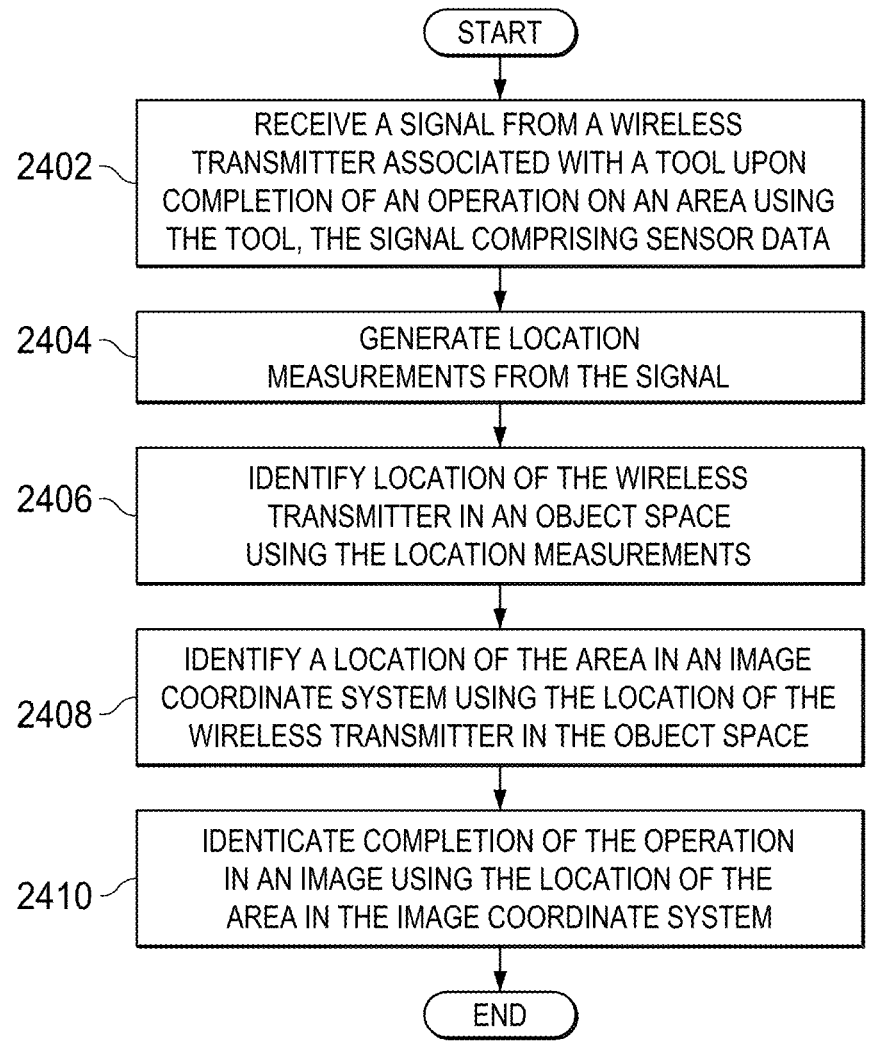
FIG. 24 is an illustration of a process for indicating the completion of an operation, in the form of a flowchart, in accordance with an illustrative embodiment.

Turning now to FIG. 24, an illustration of a process for indicating the completion of an operation, in the form of a flowchart is depicted in accordance with an illustrative example. The process illustrated in FIG. 24 may be implemented in manufacturing environment 2200 to indicate completion of operation 2214.

The process begins by receiving a signal from a wireless transmitter associated with a tool upon completion of an operation on an area using the tool, the signal comprising sensor data (operation 2402). The process may receive the signal at a number of radios such as number of radios 2238 of locating system 2208 in FIG. 22. The process then generates location measurements from the signal (operation 2404). Location measurements may include AOA, TDOA, or other suitable measurements. Location measurements may be generated by a number of radios such as number of radios 2238 of locating system 2208 in FIG. 22. Following generation of the location measurements, the process identifies a location of the wireless transmitter in an object space using the location measurements (operation 2406). The location of the wireless transmitter in the object space may be identified by a processor, such as processor 2244 in display and reporting system 2210 of FIG. 22.

Using the location of the wireless transmitter in the object space, the process then identifies a location of the area in an image coordinate system (operation 2208). The location of the area in the image coordinate system may be identified by a processor, such as processor 2244 in display and reporting system 2210 of FIG. 22. The process may use other data in addition to the location measurements to identify the location of the area. Other data may include additional location measurements gathered from additional signals, known limitations of the object space, data within the signal, additional sensor data, and other types of data. Further, the process may identify the location of the area in the object space prior to identifying a location of the area in the image space.

In one illustrative example, the process converts the location of the wireless transmitter in the object space to a location of the wireless transmitter in the image space. Based on the location of the wireless transmitter in the image space, the location of the area in the image space is identified.

In another illustrative example, the process identifies the location of the area in the object space from the location of the wireless transmitter in the object space. The process then converts the location of the area in the object space to a location in the image space to identify the location of the area in the image coordinate system.

Location of the area may be identified in a variety of ways. In one illustrative example, the tool contains a single transmitter. In this illustrative example, the location of the area may be identified based on movement of the tool and thus movement of the transmitter. The location of the area may be identified based on multiple signals from the transmitter during the operation. In another illustrative example, a gyroscope or other directional sensor may be used in conjunction with the transmitter. A single signal in combination with a directional measurement can be used to identify the location of the area.

In another illustrative example, the tool may have two transmitters. The location of the area may be identified based on a single signal from both transmitters. A vector may be drawn through the identified location of both transmitters. Based on the identified location of both transmitters, an orientation of the tool in object space may be identified. Further, based on a known distance from one of the transmitters to a functional component, the location of the functional component, and thus the area, can be identified.

The locations of number of transmitters may be supplemented by additional data to identify the location of the area. This additional data may be selected from at least one of: gyroscopic data, object space constraints, type of tool, additional sensor data, and other types of data. Gyroscopic data may include data which indicates the direction the tool is facing within the object space. Object space constraints may include known constraints of the manufacturing environment including location of physical objects within object space, known locations of areas within object space, types of areas within object space, and other constraints.

In one illustrative example, the tool is a hole measuring device. Based on the type of tool, the type of area to receive an operation is a hole. In one illustrative example, the locations of all holes within the manufacturing environment are known. Accordingly, by comparing the identified location of the transmitter of the hole measuring device to the known locations of the holes, the hole receiving the operation may be identified.

In another illustrative example, the tool to perform an operation is a drill. In this illustrative example, the drill has a known length and width. Additionally, the location of walls within the object space near the drill is known. The drill cannot pass through walls or other solid objects. As a result, location of the drill may be identified by process of elimination, reducing the possible locations by those in which the drill would have to intersect the walls.

After identifying the location of the area in the image coordinate system, the location of the area is used to identify the completion of the operation in an image (operation 2412). The completion of the operation may be identified through the use of a chart, a graph, a two dimensional image, a three dimensional image, a color, or other data.

In one illustrative example, completion of the operation may be identified by coloring an area in the image space a color representing completion. In one illustrative example, the image space represents all holes to be drilled in a component. After a drill has drilled a first hole in the component, the region representing the first hole in the image space may be colored green.

Figure 25:
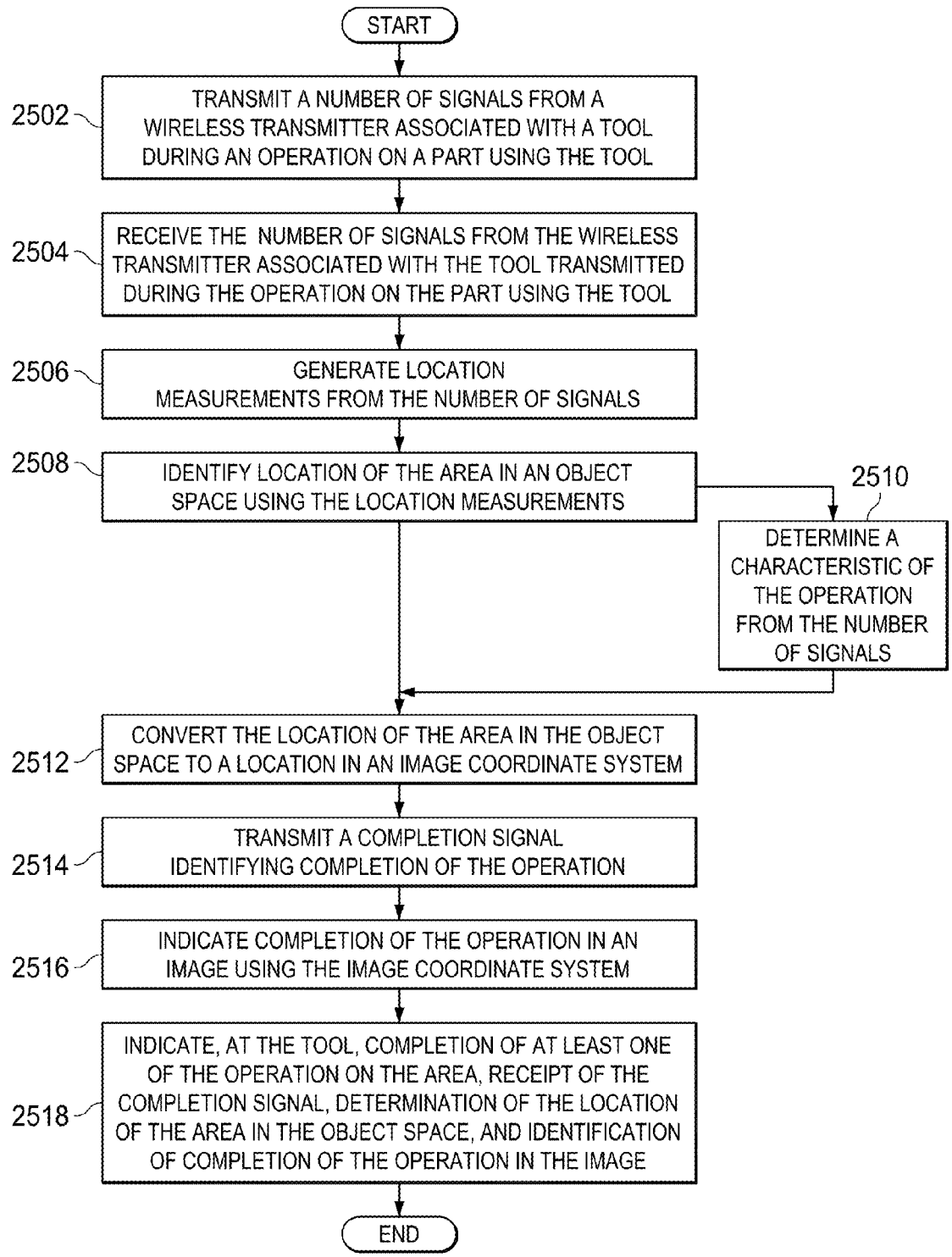
FIG. 25 is an illustration of a process for indicating the completion of an operation, in the form of a flowchart, in accordance with an illustrative embodiment.

In another illustrative example, completion of the operation may be identified by displaying data related to the area in a table. One illustrative example of displaying data in table form is table 98 of FIG. 9. Table 98 displays the module number, fitting number, and torque value of the area which received the operation. In another illustrative example, Turning now to FIG. 25, an illustration of a process for indicating the completion of an operation in the form of a flowchart is depicted in accordance with an illustrative example. The process illustrated in FIG. 25 may be implemented in manufacturing environment 2200 by tool 2204, locating system 2208, and display and reporting system 2210 to indicate completion of operation 2214.

The process begins by transmitting a number of signals from a wireless transmitter associated with the tool during an operation on an area using the tool (operation 2502). Next the process receives the number of signals from the wireless transmitter associated with the tool which were transmitted during the operation on the part using the tool (operation 2504). The process may receive the number of signals at a number of radios such as number of radios 2238 of FIG. 22. The process then generates location measurements from the number of signals (operation 2506). Location measurements may include angle of arrival (AOA), time difference of arrival (TDOA), or other suitable measurements. Location measurements may be generated by a number of radios such as number of radios 2238 of locating system 2208 in FIG. 22. Using the location measurements, the process then identifies the location of the area in an object space (operation 2508). The location of the area in the object space may be identified by a processor, such as processor 2244 in display and reporting system 2210 of FIG. 22. The process may then optionally determine a characteristic of the operation from the number of signals (operation 2510). Characteristics may be determined by a processor, such as processor 2244 in display and reporting system 2210 of FIG. 22. In one illustrative example, the tool is a torque wrench and a characteristic of the operation is whether the torque wrench is tightening or loosening a corresponding nut. In another illustrative example, the tool is a surface preparation tool and the characteristic of the operation is the speed at which the tool moves across the material.

The process converts the location of the area in the object space to a location in an image coordinate system (operation 2512). The conversion may be performed by a processor such as such as processor 2244 in display and reporting system 2210 of FIG. 22. In some illustrative examples, the location of the area in the image coordinate system may be used to identify a specific part or region in a schematic or three dimensional data set employing the image coordinate system.

The process next transmits a completion signal identifying completion of the operation (operation 2514). The completion signal may be transmitted by a wireless transmitter such as number of transmitters 2228 of tool 2204 in FIG. 22. The process then identifies completion of the operation in an image using the image coordinate system (operation 2516). The indication of completion may be triggered by a processor such as processor 2244 in display and reporting system 2210 in FIG. 22. Identification of completion of the operation may be on at least one of a display such as number of displays 2248 in display and reporting system 2210 in FIG. 22, an indicator such as indicator 2230 of tool 2204 in FIG. 22, or other suitable equipment. Finally, the process indicates at the tool completion of at least one of the operation on the area, receipt of the completion signal, determination of the location of the area in the object space, and identification of completion of the operation in the image (operation 2518). Indication at the tool may be at an indicator such as indicator 2230 of FIG. 22.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in FIG. 24, location of the wireless transmitter in the object space may be converted to the image coordinate system prior to identifying a location of the area. Additionally, in FIG. 25, the location of the area in the object space may be converted to a location in an image coordinate system after transmission of the completion signal.

Accordingly, the illustrative embodiments provide for methods of completing and indicating completion of operations in an environment. The method may be performed in harsh radio frequency environments. The method may be performed with a variety of different tools. Additionally the method supports implementation of a knowledge-based control system providing real time information.

Further, the illustrative embodiments may provide at the tool indications of the completion of functions. The illustrative embodiments may also be implemented for gathering operation characteristics and other data for completed operations. The illustrative embodiments may be used to verify satisfactory completion of operations based on quantitative data. Moreover, the illustrative embodiments may also be used to indicate locations which require an operation to be performed.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
   a tool configured to perform an operation on an area, the tool comprising a first wireless transmitter and a second wireless transmitter, the first wireless transmitter transmitting a first signal comprising sensor data upon completion of the operation, and the second wireless transmitter transmitting a second signal upon completion of the operation;
   a number of radios configured to generate first location measurements using the first signal and second location measurements using the second signal, wherein the first location measurements comprise a first angle of arrival of the first signal and a first time of arrival of the first signal and the second location measurements comprise a second angle of arrival of the second signal and a second time of arrival of the second signal; and
   a processor identifying a position of the tool using the first location measurements and thereby locating a location of the area, identifying an orientation of the tool using the first location measurements and the second location measurements, and generating an indication of completion of the operation.

2. The system of claim 1, wherein the tool further comprises:
   an indicator configured to indicate the generation of the indication of completion of the operation and at least one of completion of the operation on the area, receipt of the first signal, identification of the location of the first wireless transmitter, and identification of the location of the area.

3. The system of claim 1, wherein the tool further comprises:
   a trigger circuit configured to trigger the first wireless transmitter and the second wireless transmitter to transmit as the tool begins the operation on the area.

4. The system of claim 1 further comprising:
   a number of areas including the area, wherein a number of locations for the number of radios is selected such that that each of the areas in the number of areas is within line-of-sight of at least two radios in the number of radios.

5. The system of claim 1, wherein the first wireless transmitter is configured to transmit a beacon signal.

6. The system of claim 1, wherein the first wireless transmitter is configured to transmit ultra wide band pulse signals.

7. The system of claim 1, wherein the first location measurements further comprise a first time difference of arrival and the second location measurements further comprise a second time difference of arrival.

8. The system of claim 1, wherein the processor is further configured to convert the location of the area in an object space to a corresponding location in an image coordinate system, and wherein the indication of completion of the operation comprises identifying completion of the operation in an image using the location in the image coordinate system.

9. A method for directing manufacturing operations comprising:
   receiving, by a computer system, a first signal from a first wireless transmitter associated with a tool upon completion of an operation on an area using the tool, the signal comprising sensor data;
   generating, by the computer system, first location measurements from the first signal, wherein the first location measurements comprise a first angle of arrival of the first signal and a first time of arrival of the first signal;
   receiving, by the computer system, a second signal from a second wireless transmitter associated with the tool upon completion of the operation on the area using the tool;
   generating, by the computer system, second location measurements from the second signal, wherein the second location measurements comprise a second angle of arrival of the second signal and a second time of arrival of the second signal;
   identifying, by the computer system, a location of the first wireless transmitter in an object space using the first location measurements and thereby locating a position of the area in the object space;
   identifying, by the computer system, an orientation of the tool in the object space using the first location measurements and the second location measurements;
   identifying, by the computer system, a location of the area in an image coordinate system using the location of the wireless transmitter in the object space; and
   indicating, by the computer system, completion of the operation in an image using the location of the area in the image coordinate system.

10. The method of claim 9 further comprising:
    receiving a number of signals from the first wireless transmitter and the second wireless transmitter during the operation; and
    identifying a characteristic of the operation from the number of signals.

11. The method of claim 10, wherein the characteristic of the operation comprises at least one of: direction of movement, speed of movement, consistency of operation, and type of operation.

12. The method of claim 9, wherein indicating completion of the operation in an image comprises displaying a representation of the area within the image representing the object space.

13. The method of claim 9 further comprising:
    indicating, at the tool, completion of the operation on the area, and at least one of receipt of the signal, determination of the location of the wireless transmitter in the object space, identification of the location of the area in the image coordinate system, and indication of completion of the operation in the image.

14. The method of claim 9, wherein the first location measurements further comprise a first time difference of arrival and the second location measurements further comprise a second time difference of arrival.

15. A method for directing manufacturing operations comprising:
    receiving, by a computer system, a number of signals from a first wireless transmitter and a second wireless transmitter associated with a tool, the number of signals transmitted during an operation on an area using the tool, the number of signals including at least one signal from the first wireless transmitter and at least one signal from the second wireless transmitter;
    generating, by the computer system, location measurements from the number of signals, wherein the location measurements comprise an angle of arrival of the number of signals and a time of arrival of the number of signals;
    identifying, by the computer system, a position of the tool in an object space using the location measurements and thereby locating a location of the area;
    converting, by the computer system, the location of the area in the object space to a location in an image coordinate system; and directing, by the computer system, manufacturing operations on the area based on the location in the image coordinate system.

16. The method of claim 15 further comprising:
receiving a completion signal identifying completion of the operation;
responsive to receipt of the completion signal, indicating completion of the operation in an image using the image coordinate system.

17. The method of claim 15 further comprising:
determining a characteristic of the operation from the number of signals.

18. The method of claim 16, wherein indicating completion of the operation in an image comprises displaying a representation of the area within an image representing the object space.

19. The method of claim 16, further comprising:
indicating, at the tool, completion of the operation on the area and at least one of receipt of the completion signal, determination of the location of the area in the object space, and identification of completion of the operation in the image.

20. The method of claim 15, wherein the first wireless transmitter and the second wireless transmitter are configured to transmit ultra wide band pulse signals.

21. A system comprising:
a number of radios configured: to generate location measurements using a first signal transmitted by a first wireless transmitter of a tool and a second signal transmitted by a second wireless transmitter of the tool, wherein the tool is configured to perform an operation on an area, wherein the location measurements comprise an angle of arrival of the first signal, a time of arrival of the first signal, an angle of arrival of the second signal, and a time of arrival of the second signal; and
a processor configured: to identify a position and orientation of the tool using the location measurements and thereby locating the location of the area, and to generate an indication of completion of the operation.

22. The system of claim 21 further comprising:
the tool, the tool having a sensor, the first wireless transmitter configured to transmit a signal comprising sensor data upon completion of the operation.

* * * * *